(12) United States Patent
Beveridge

(10) Patent No.: US 10,965,733 B2
(45) Date of Patent: Mar. 30, 2021

(54) EFFICIENT, AUTOMATED DISTRIBUTED-SEARCH METHODS AND SYSTEMS

(71) Applicant: VMware, Inc., Palo Alto, CA (US)

(72) Inventor: Daniel James Beveridge, Apollo Beach, FL (US)

(73) Assignee: VMware, Inc., Palo Alto, CA (US)

( * ) Notice: Subject to any disclaimer, the term of this patent is extended or adjusted under 35 U.S.C. 154(b) by 1183 days.

(21) Appl. No.: 15/285,355

(22) Filed: Oct. 4, 2016

(65) Prior Publication Data

US 2018/0060361 A1 Mar. 1, 2018

Related U.S. Application Data

(60) Provisional application No. 62/380,450, filed on Aug. 28, 2016.

(51) Int. Cl.
*H04L 29/08* (2006.01)
*G06F 9/455* (2018.01)
(Continued)

(52) U.S. Cl.
CPC .............. *H04L 67/10* (2013.01); *G06F 9/455* (2013.01); *G06F 9/45558* (2013.01);
(Continued)

(58) Field of Classification Search
CPC ..... H04L 47/70; H04L 67/10; G06F 16/2471; G06F 9/455; G06F 9/45558; G06F 2009/45579
(Continued)

(56) References Cited

U.S. PATENT DOCUMENTS

| | | | | |
|---|---|---|---|---|
| 5,381,407 A | * | 1/1995 | Chao | ................... H04L 12/5602 370/233 |
| 6,693,651 B2 | * | 2/2004 | Biebesheimer | ....... G06F 16/338 715/837 |

(Continued)

OTHER PUBLICATIONS

Bijon K, Krishnan R, Sandhu R. Mitigating multi-tenancy risks in iaas cloud through constraints-driven virtual resource scheduling. InProceedings of the 20th ACM Symposium on Access Control Models and Technologies Jun. 1, 2015 (pp. 63-74). ACM. (Year: 2015).*

(Continued)

*Primary Examiner* — Mohsen Almani

(57) ABSTRACT

The current document is directed to efficient, distributed-search methods and subsystems within distributed computer systems, including computer systems distributed over multiple sets of geographically distributed data centers, each comprising multiple discrete computer systems, such as multi-processor servers. In one implementation, the distributed-search methods and subsystems are implemented locally within participating entities as well as within one or more distributed-search engines. Each search is directed, by a participant, to identify attribute-associated entities within, provided by, connected to, or otherwise accessible to a distributed computing system having attribute values specified or indicated by the search query. Certain attribute values are continuously collected and centrally stored by the one or more centralized distributed-search engines while other attribute values are obtained through information requests distributed among participating entities.

22 Claims, 42 Drawing Sheets

(51) Int. Cl.
*G06F 16/2458* (2019.01)
*H04L 12/911* (2013.01)

(52) U.S. Cl.
CPC .......... *G06F 16/2471* (2019.01); *H04L 47/70* (2013.01); *G06F 2009/45579* (2013.01)

(58) Field of Classification Search
USPC ........................................................ 707/706
See application file for complete search history.

(56) References Cited

U.S. PATENT DOCUMENTS

| | | | | |
|---|---|---|---|---|
| 6,934,702 | B2* | 8/2005 | Faybishenko | G06F 16/9535 707/749 |
| 7,013,033 | B2* | 3/2006 | Arena | G06K 9/00 382/129 |
| 2002/0002512 | A1* | 1/2002 | Harpale | G06Q 40/04 705/26.35 |
| 2003/0050924 | A1* | 3/2003 | Faybishenko | G06F 16/9535 |
| 2006/0155633 | A1* | 7/2006 | Fellenstein | G06Q 40/04 705/37 |
| 2007/0038601 | A1* | 2/2007 | Guha | G06F 16/9535 |
| 2007/0297414 | A1* | 12/2007 | Gupta | H04L 47/10 370/395.4 |
| 2008/0059466 | A1* | 3/2008 | Luo | G06F 16/285 |
| 2009/0030833 | A1* | 1/2009 | Leung | G06Q 40/04 705/37 |
| 2011/0055385 | A1* | 3/2011 | Tung | G06F 9/5072 709/224 |
| 2012/0198073 | A1* | 8/2012 | Srikanth | H04L 67/10 709/226 |
| 2012/0221454 | A1* | 8/2012 | Morgan | G06F 9/5027 705/37 |
| 2015/0067171 | A1 | 3/2015 | Yum et al. | |
| 2015/0326449 | A1 | 11/2015 | Melander et al. | |
| 2017/0063708 | A1* | 3/2017 | Hsu | H04L 67/1097 |

OTHER PUBLICATIONS

Amin, Muhammad Bilal, et al. "Intercloud message exchange middleware." Proceedings of the 6th International Conference on Ubiquitous Information Management and Communication. 2012. (Year: 2012).*

Vilutis, G., et al. "The QoGS Method Application for Selection of Computing Resources in Intercloud." Elektronika it Elektrotechnika 19.7 (2013): 98-103. (Year: 2013).*

Aliyu So, Chen F, Li H. A Self-Tuning procedure for resource management in InterCloud Computing. In2016 IEEE International Conference on Software Quality, Reliability and Security Companion (QRS-C) Aug. 1, 2016 (pp. 326-333). IEEE. (Year: 2016).*

Bernstein, David, and Deepak Vij. "Intercloud directory and exchange protocol detail using XMPP and RDF." 2010 6th World Congress on Services. IEEE, 2010. (Year: 2010).*

Grozev, Nikolay, and Rajkumar Buyya. "Inter-Cloud architectures and application brokering: taxonomy and survey." Software: Practice and Experience 44.3 (2014): 369-390. (Year: 2014).*

Di Martino, Beniamino, et al. "Towards an Ontology-Based Intercloud Resource Catalogue—The IEEE P2302 Intercloud Approach for a Semantic Resource Exchange." 2015 IEEE International Conference on Cloud Engineering. IEEE, 2015. (Year: 2015).*

Sotiriadis, Stelios, et al. "SimIC: Designing a new inter-cloud simulation platform for integrating large-scale resource management." 2013 IEEE 27th International Conference on Advanced Information Networking and Applications (AINA). IEEE, 2013. (Year: 2013).*

Hsu, Ching-Hsien, et al. "Algorithms and Architectures for Parallel Processing 10th International Conference, ICA3PP 2010, Busan, Korea, May 21-23, 2010. Proceedings. Part I." Conference proceedings ICA3PP. 2010. (Year: 2010).*

International Search Report, dated Nov. 29, 2017.

* cited by examiner

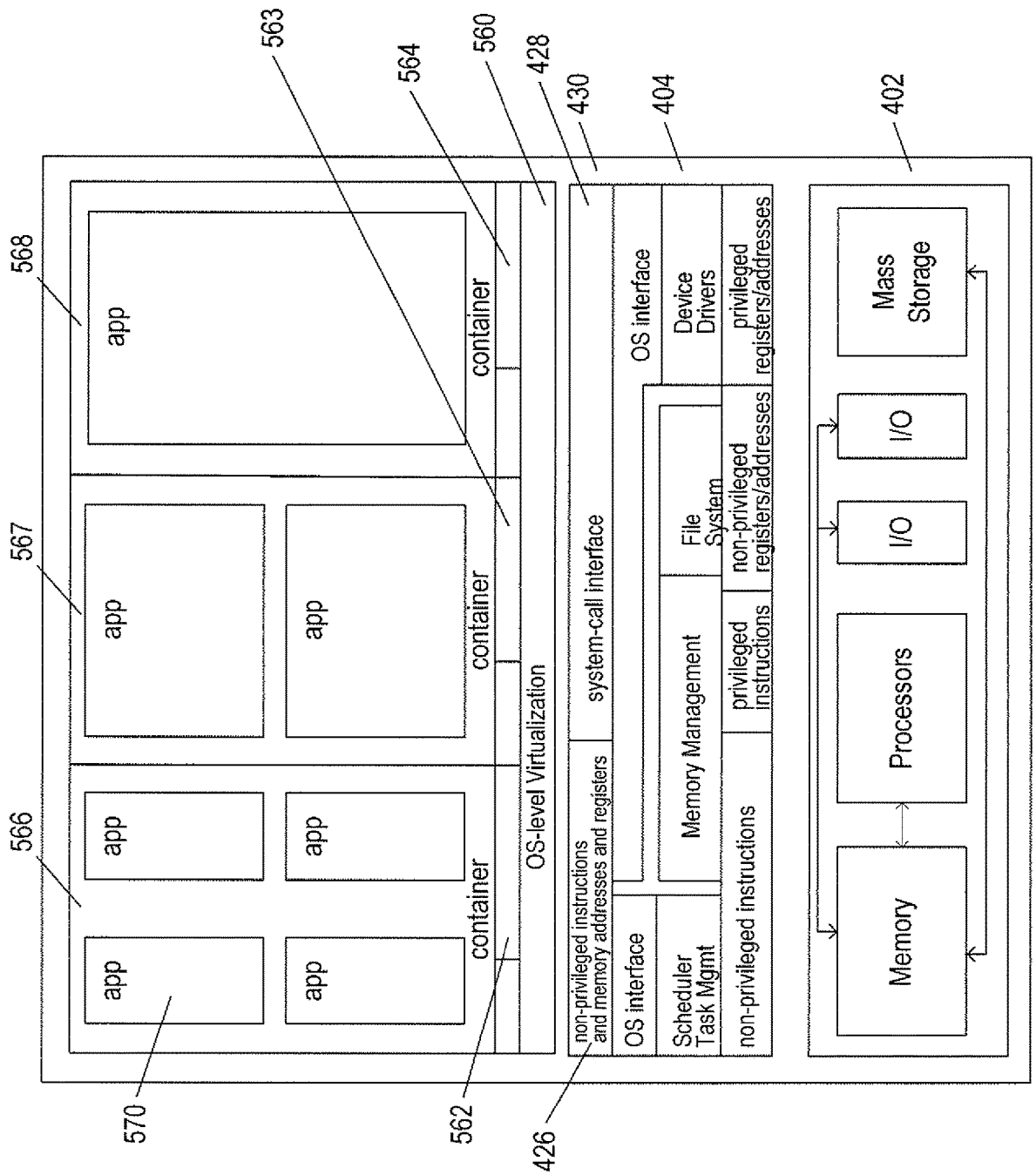

1240 — filter     attribute : relational_expression

1242 — policy     filter
                 {filter, filter}
                 {filter, filter, . . . , filter}

1244 — search_evaluation_expression     evaluator
                                             {evaluator, evaluator}
                                             {evaluator, evaluator, . . . , evaluator}

1246 — evaluator     simple_evaluator
                    weight, simple_evaluator 1248 — simple evaluator     minimum-positive_attribute
                            floor, minimum-positive_attribute 1250 — minimum-positive_attribute     numeric or ordered-set attribute with values that map to a set of numerically increasing values ordered in descending order with respect to desirability or fitness 1252 — search     search_evaluation_expression
                search_evaluation_expression, policy
                search_evaluation_expression, {policy, . . . , policy}

```
const int MAX_QUEUES = 5;
const int MAX_QUEUE_SIZE = 8;
const int MAX_ATTRIBUTE_VALUES = 5;
const double NO_ENTRIES = -100000000;
const double NO_FLOOR = -100000000;
const double NO_MAX = -100000000;
const int NO_INDEX = -100000000;
const double MORE_THAN_MAX = 1000000000;
```
1702

```
typedef struct e
{
        double weight;        — 1705
        double floor;         — 1706
} Evaluator;
```
1704

```
class message
{
        private:            — 1709
                int ID;     — 1710
                int num;
                double values[MAX_ATTRIBUTE_VALUES];   — 1711
        public:
                int getNum();
                double getAttribute(int att);
                message (int id, int numAttributeValues, double* attributeValues);
                message ();
};
```
1708  1712

```
class attributeValueQueue
{
        private:
                double q[MAX_QUEUE_SIZE];   — 1715
                int num;                    — 1716
        public:
                double getMax();            — 1717
                int getNum();               — 1718
                bool insert(double nxt);    — 1719
                void prune(double val);     — 1720
                attributeValueQueue();      — 1721
};
```
1714

FIG. 17A

```
typedef attributeValueQueue* QPTR;              ⎯ 1722 class masterQueue
{
        private:
                message q[MAX_QUEUE_SIZE];      ⎯ 1725
                int num;                        ⎯ 1726
                double scores[MAX_QUEUE_SIZE];  ⎯ 1727
                Evaluator* searchEval;          ⎯ 1728
                int numAtt;                     ⎯ 1729

1724 {
        public:
                int getNum();                   ⎯ 1730
                message* getBest(int & add, double & score);   ⎯ 1731
                message* getNextBest(int & add, double & prev); ⎯ 1732 / 1733
                bool insert(message nxt, message& gone, double* maxArray);
                masterQueue(int numA, Evaluator* sEval);
                                                ⎯ 1734
};

class searchContext
{
        private:
                QPTR queues[MAX_QUEUES];        ⎯ 1737
                double maxes[MAX_QUEUES];       ⎯ 1738
                masterQueue MQ;                 ⎯ 1739
                int numAttributes;              ⎯ 1740
                Evaluator* searchEvaluator;     ⎯ 1741
                int add;                        ⎯ 1742
1736 {          double prev;                    ⎯ 1743 public:
                bool inputMessage(message m);   ⎯ 1744
                int getNumResults();            ⎯ 1745
                message* getFirstResult();      ⎯ 1746
                message* getNextResult();       ⎯ 1747
                searchContext(int numA, Evaluator* sE); ⎯ 1748
                ~searchContext();               ⎯ 1749
};

int message::getNum()
{
        return num;
}
```

FIG. 17B

```
double message::getAttribute(int att)
{
        return values[att];
} message::message (int id, int numAttributeValues, double* attributeValues)
{
        int i;

ID = id;
        num = numAttributeValues;
        for (i = 0; i < num; i++) values[i] = attributeValues[i];
} message::message ()
{
        int i;

ID = 0;
        num = 0;
        for (i = 0; i < num; i++) values[i] = 0;
} double attributeValueQueue::getMax()
{
        if (num > 0 && num <= MAX_QUEUE_SIZE) return q[num - 1];
        else return NO_ENTRIES;
} int attributeValueQueue::getNum()
{
        return num;
}
```

FIG. 17C

```
bool attributeValueQueue::insert(double nxt)
{
    int i, j, k;

if (num >= MAX_QUEUE_SIZE) return false;
    i = 0;
    while (i < num && q[i] <= nxt) i++;
    if (i == num) q[num] = nxt;
    else
    {
        for (j = num, k = num -1; j > i; j--, k--) q[j] = q[k];
        q[i] = nxt;
    }
    num++;
    return true;
}
```
1750

```
void attributeValueQueue::prune(double val)
{
    int i = 0;
    int j;

while (q[i] != val && i < num - 1) i++;
    if (i != num - 1)
    {
        for (j = i; j < num - 1; j++) q[j] = q[j + 1];
    }
    num--;
}
```
1752

```
attributeValueQueue::attributeValueQueue()
{
    num = 0;
} int masterQueue::getNum()
{
    return num;
}
```

FIG. 17D

```
bool masterQueue::insert(message nxt, message& gone, double* maxArray)
{
    int i, j;
    double score, tScore;
    double maxScore = NO_MAX;
    int maxIndex;

if (num >= MAX_QUEUE_SIZE) return false;
    q[num++] = nxt;                                                              ← 1764 for (i = 0; i < num; i++)
    {
        score = 0;
        for (j = 0; j < numAtt; j++)
        {
            tScore = q[i].getAttribute(j);
            if (searchEval[j].floor != NO_FLOOR && tScore < searchEval[j].floor)
                tScore = searchEval[j].floor;
            tScore = ((tScore / maxArray[j]) * 100) * searchEval[j].weight;
            score += tScore;
        }
        scores[i] = score;
        if (num == MAX_QUEUE_SIZE)
        {
            if (score > maxScore)
            {
                maxScore = score;
                maxIndex = i;
            }
        }
    }                                                                            ← 1766
    if (num == MAX_QUEUE_SIZE)
    {
        gone = q[maxIndex];
        q[maxIndex] = q[num - 1];
        num--;
    }                                                                            ← 1768
    return true;
}
```

FIG. 17E

```
masterQueue::masterQueue(int numA, Evaluator* sEval)
{
        numAtt = numA;
        searchEval = sEval;
        num = 0;
} bool searchContext::inputMessage(message m)
{
        bool oneLess = false;
        int j;
        message gone;

if (MQ.getNum() == MAX_QUEUE_SIZE - 1)
        {
                for (j = 0; j < numAttributes; j++)
                {
                        if (m.getAttribute(j) < queues[j]->getMax())
                        {
                                oneLess = true;
                                break;
                        }
                }
                if (!oneLess) return (true);
        } for (j = 0; j < numAttributes; j++)
        {
                if (!queues[j]->insert(m.getAttribute(j))) return false;
                maxes[j] = queues[j]->getMax();
        }
        if (!MQ.insert(m, gone, maxes)) return false;
        if (MQ.getNum() < queues[0]->getNum())
        {
                for (j = 0; j < numAttributes; j++)
                        queues[j]->prune(gone.getAttribute(j));
        }
} int searchContext::getNumResults()
{
        return MQ.getNum();
}
```

FIG. 17F

```
message* searchContext::getFirstResult()
{
        return MQ.getBest(add, prev);
} message* searchContext::getNextResult()
{
        return MQ.getNextBest(add, prev);
} searchContext::searchContext(int numA, Evaluator* sEval) : MQ(numA, sEval)
{
        int i;

for (i = 0; i < numA; i++) queues[i] = new attributeValueQueue;

numAttributes = numA;
        searchEvaluator = sEval;
} searchContext::~searchContext()
{
        int i;

for (i = 0; i < numAttributes; i++) delete queues[i];
}
```

FIG. 17G

EFFICIENT, AUTOMATED DISTRIBUTED-SEARCH METHODS AND SYSTEMS

CROSS-REFERENCE TO RELATED APPLICATION

This application claims the benefit of Provisional Application No. 62/380,450, filed Aug. 28, 2016.

TECHNICAL FIELD

The current document is directed to distributed computer systems, distributed-computer-system management subsystems, and, in particular, to an automated distributed-search subsystem within a distributed computer system that queries participant computer systems and/or other processor-controlled devices within the distributed computer system, continuously updates a search context based on received responses, and returns a set of one or more search results to a specified recipient.

BACKGROUND

Computer systems and computational technologies have steadily evolved, during the past 70 years, from initial vacuum-tube-based systems that lacked operating systems, compilers, network connectivity, and most other common features of modern computing systems to vast distributed computing systems that today provide computational resources to hundreds, thousands, tens of thousands, or more users from large numbers of multi-processor servers, data-storage appliances, and multiple layers of internal communications networks within data centers interconnected by various types of wide-area networks. As hardware, operating systems, and virtualization layers were developed and refined, over the years, in parallel to the advancements in computer hardware and networking, the robust execution environments provided by distributed operating systems and virtualization layers have provided a foundation for development and evolution of many different types of distributed application programs, including distributed database-management systems, distributed client-server applications, and distributed web-based service-provision applications. This has resulted in a geometric increase in the complexity of distributed computer systems, as a result of which owners, administrators, and users of distributed computer systems and consumers of computational resources provided by distributed computing systems increasingly rely on automated and semi-automated management and computational-resource-distribution subsystems to organize the activities of many users and computational-resource consumers and to control access to, and use of, computational resources within distributed computer systems. Many management subsystems are increasingly burdened with collecting various types of information from a wide variety of different types of entities within distributed computing systems, identifying particular entities, groups of entities, or classes of entities having certain characteristics and attributes, and using the identified entities, groups of entities, or classes of entities in myriad different management and computational-resource-distribution tasks and operations. In very large distributed computing systems, the continuous collection and processing of various types of information from thousands, tens of thousands, or more distributed-computing-system entities may represent significant computational-resource overheads and involve significant temporal overheads with respect to the large variety of management and computational-resource-distribution tasks and operations. Equivalent problems and challenges arise in distributed database-management systems, web-based client-server applications, including social-network applications, and in many additional systems. Therefore, owners, administrators, and users of distributed computing systems as well as consumers of computational resources and services provided by distributed computing systems seek efficient methods and subsystems for identifying particular entities, groups of entities, or classes of entities characterized by particular attribute values and contained within, provided by, connected to, or otherwise accessible to large distributed computing systems as a basis for the large variety of management, information acquisition and distribution, and computational-resource-distribution tasks and operations.

SUMMARY

The current document is directed to efficient, distributed-search methods and subsystems within distributed computer systems, including computer systems distributed over multiple sets of geographically distributed data centers, each comprising multiple discrete computer systems, such as multi-processor servers. In one implementation, a distributed-search subsystem is implemented locally in server clusters, virtual data centers, or in other groups or collections of discrete computer systems as well as within one or more centralized distributed-search engines. Each search is directed to identify attribute-associated entities within, provided by, contained in, connected to, or otherwise accessible to a distributed computing system having attribute values specified or indicated by the search query. Static attribute values are continuously collected and centrally stored by the one or more centralized distributed-search engines while other dynamic attribute values are obtained through information requests distributed among participants. When a distributed search is initiated by a search request transmitted to a distributed-search engine, the distributed-search engine filters computer-system participants based on the centrally stored attribute values in order to select a set of target participants to which information requests are distributed. The distributed-search engine maintains a search context for each active distributed search in which a small set of the most favorably scored information-request responses returned by participants is maintained and updated as information-request responses are received. When search-termination criteria are met, the most favorably scored responses are verified and returned to a search-result recipient specified in the search request.

BRIEF DESCRIPTION OF THE DRAWINGS

FIGS. 5A-D illustrate several types of virtual machine and virtual-machine execution environments.

FIGS. 12A-C illustrate certain of the information and data entities used within the currently disclosed distributed-search methods and subsystems.

FIGS. 16A-B illustrate operation of the evaluator queues and master queue within an active search context.

FIGS. 17A-G provide a simple C++ implementation of the evaluator queues and master queue within an active search context.

DETAILED DESCRIPTION OF EMBODIMENTS

The current document is directed to distributed-search methods and subsystems In a first subsection, below, computer systems, virtualization layers, and distributed computer systems are described, in overview, to provide context for a second subsection in which the distributed-search methods and subsystems are discussed both in overview and in detail.

Overview of Computer Systems and Computer Architecture

Figure 1:
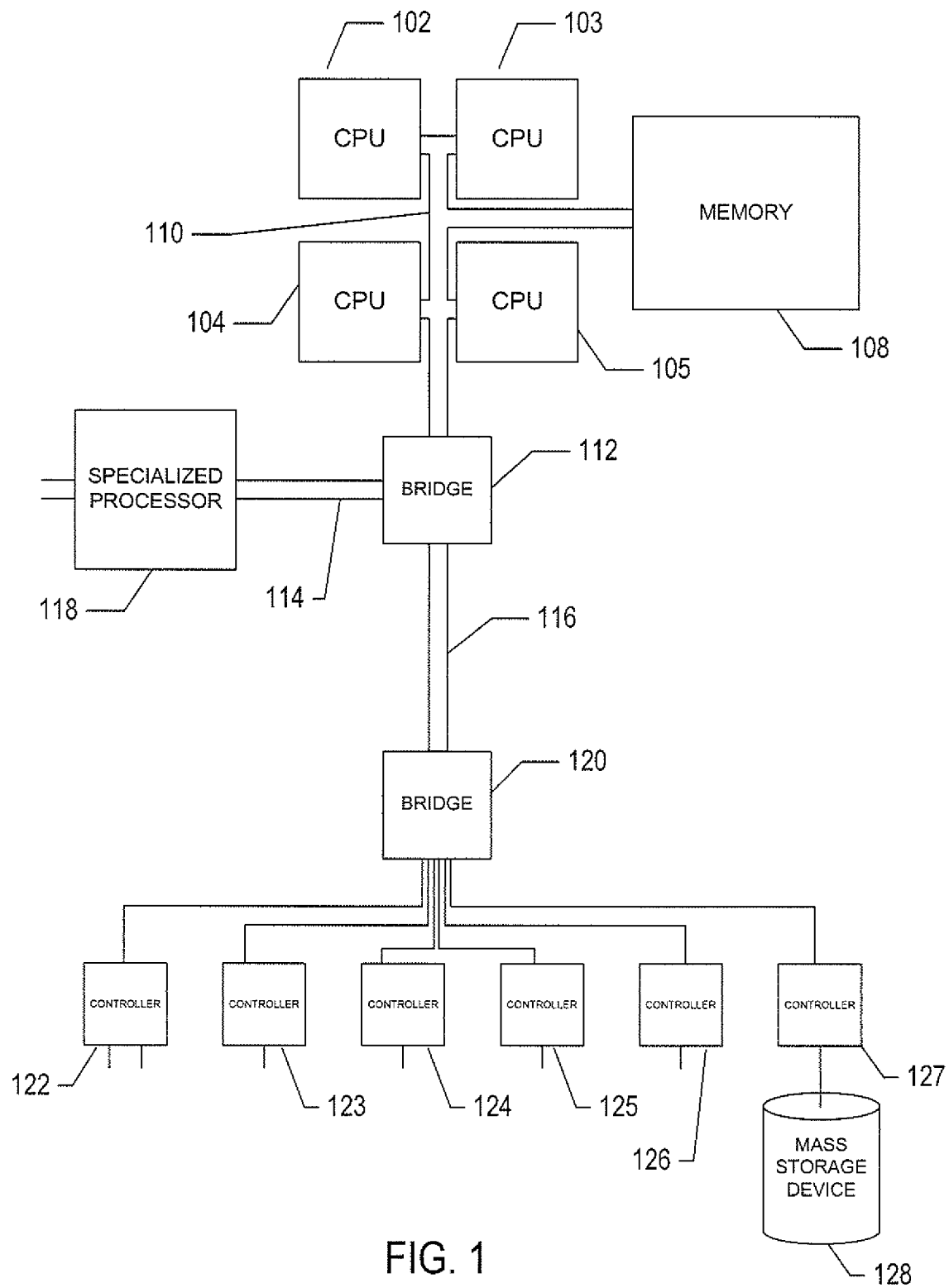
FIG. 1 provides a general architectural diagram for various types of computers.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
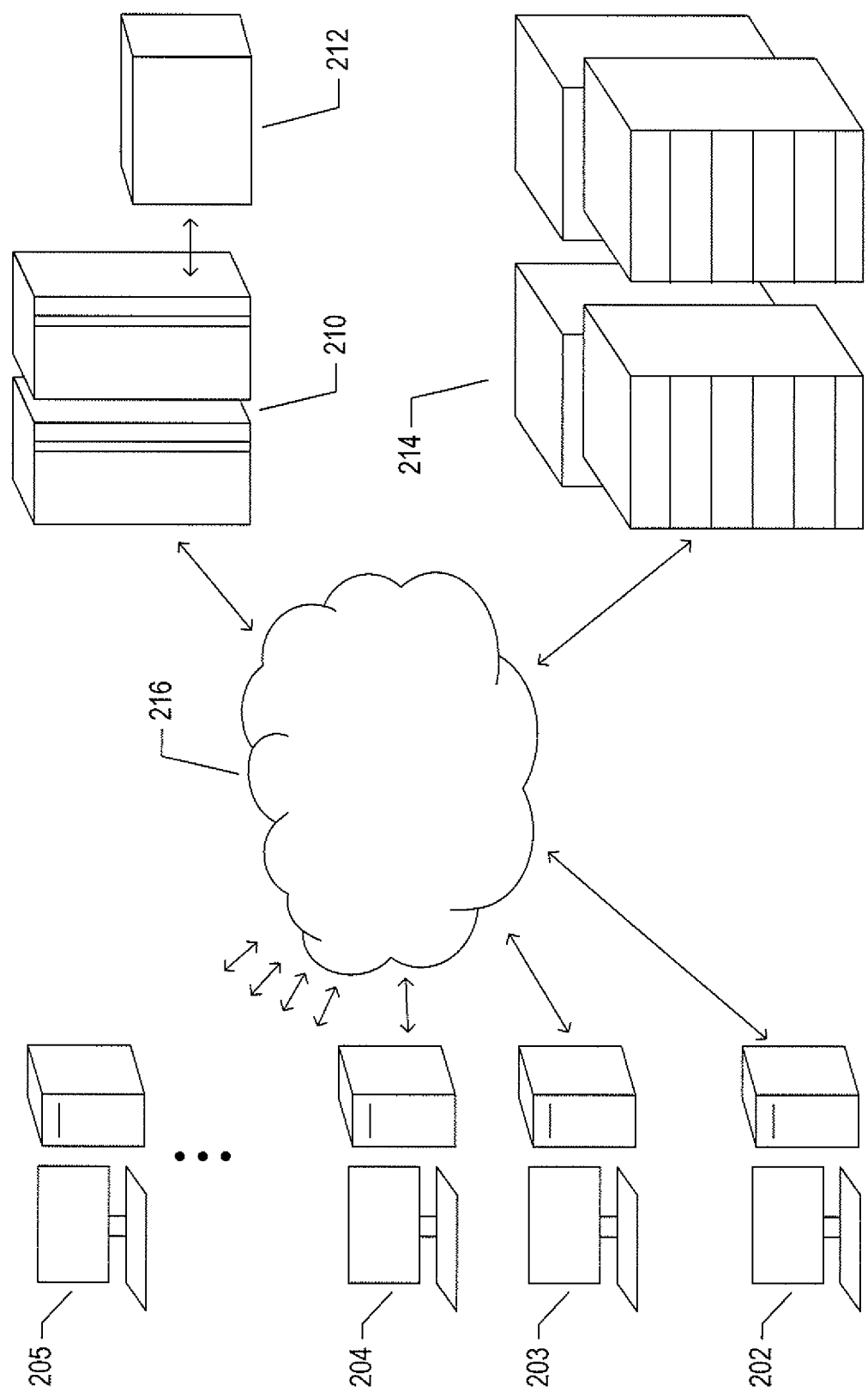
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computer systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
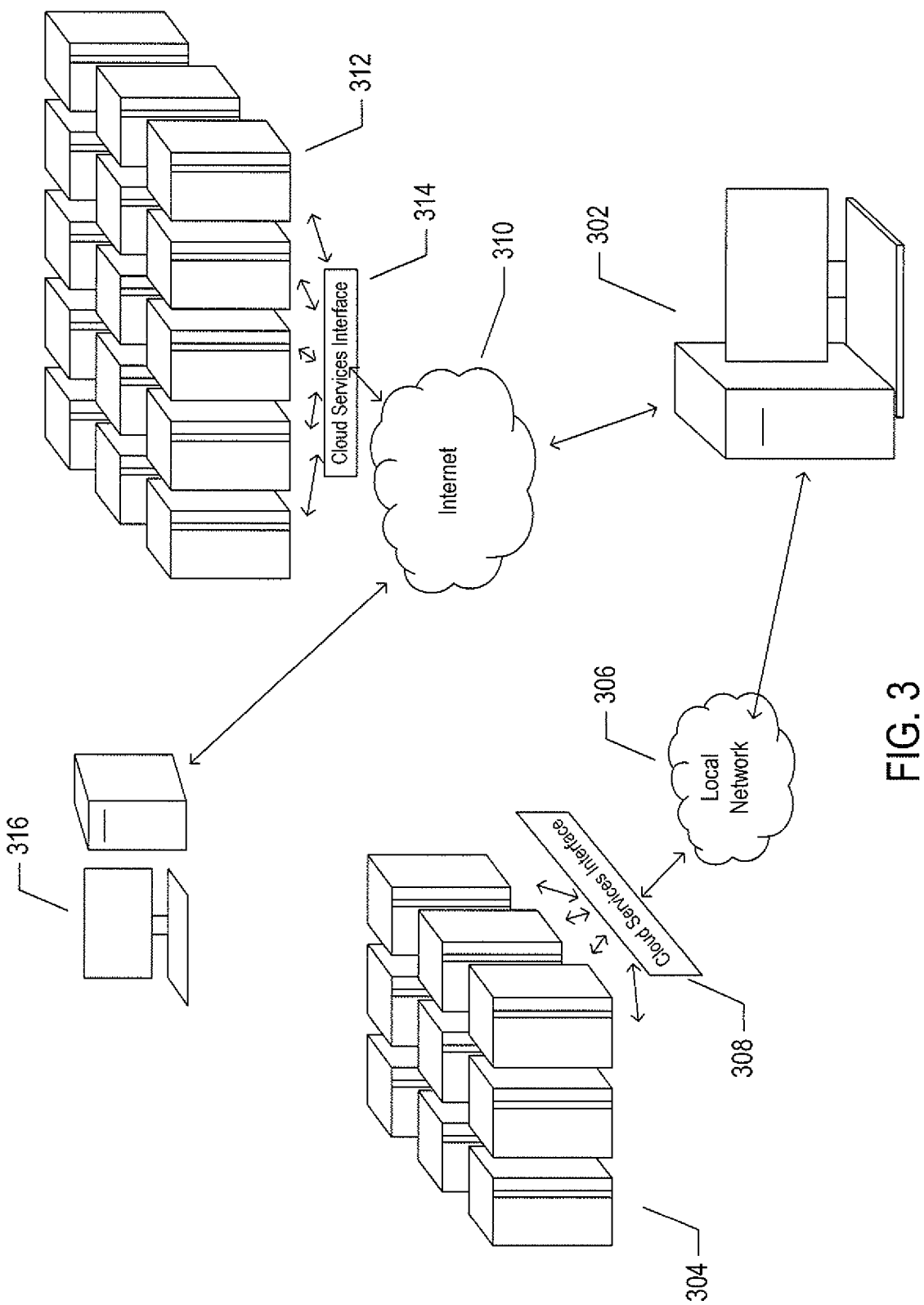
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Figure 4:
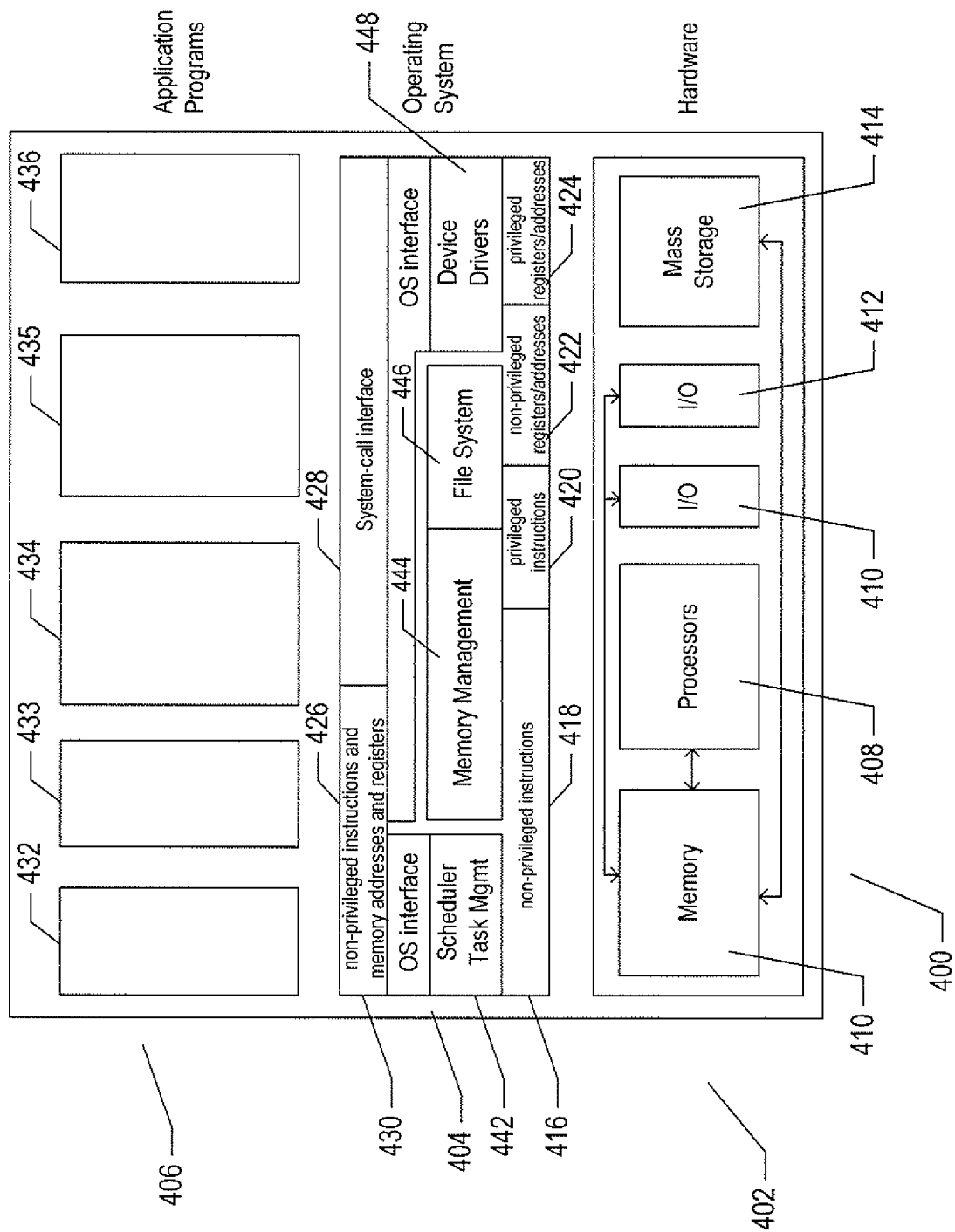
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory resources as a high-level, easy-to-access, file-system interface.

In many modern operating systems, the operating system provides an execution environment for concurrent execution of a large number of processes, each corresponding to an executing application program, on one or a relatively small number of hardware processors by temporal multiplexing of process execution. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
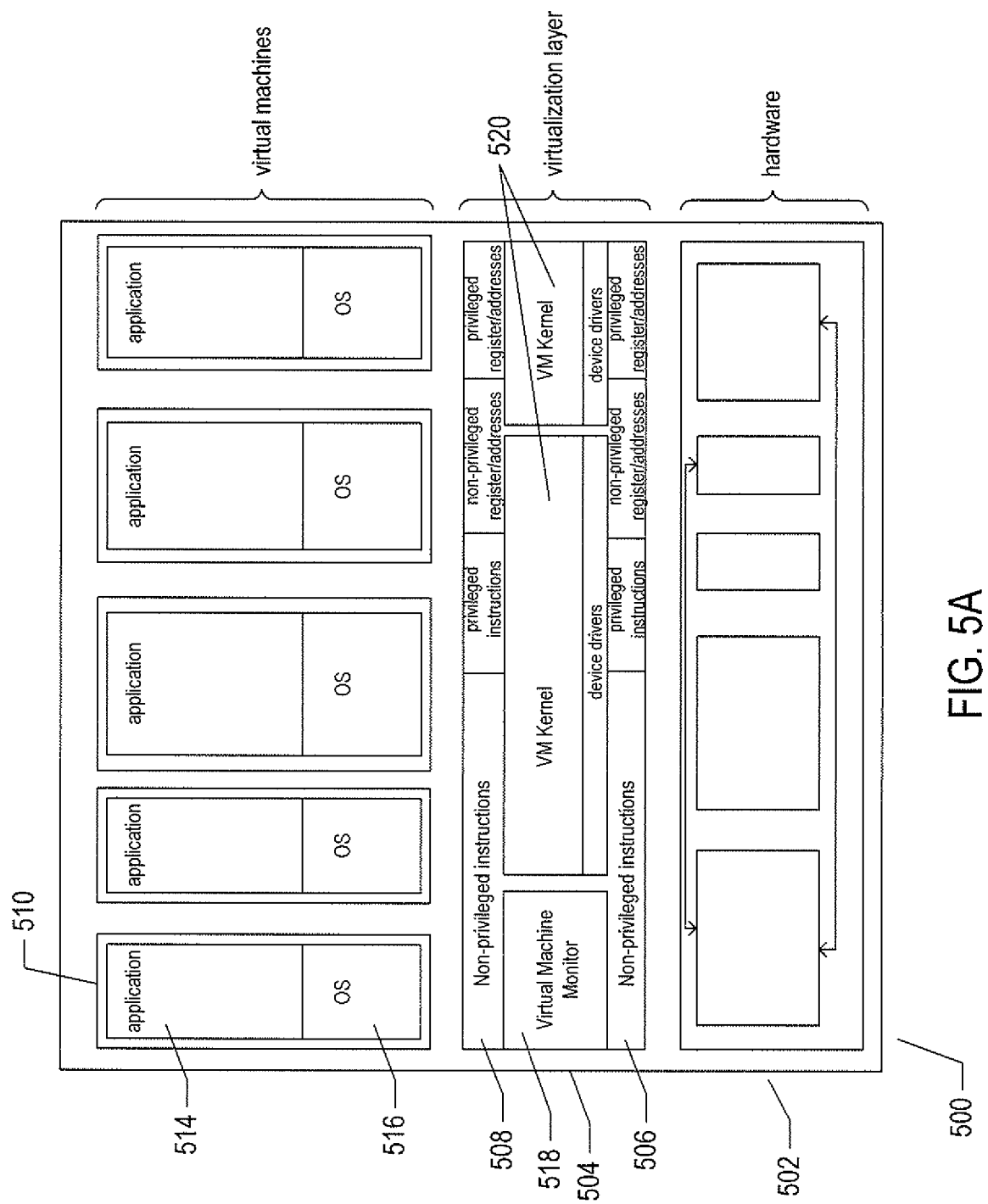
Figure 5B:
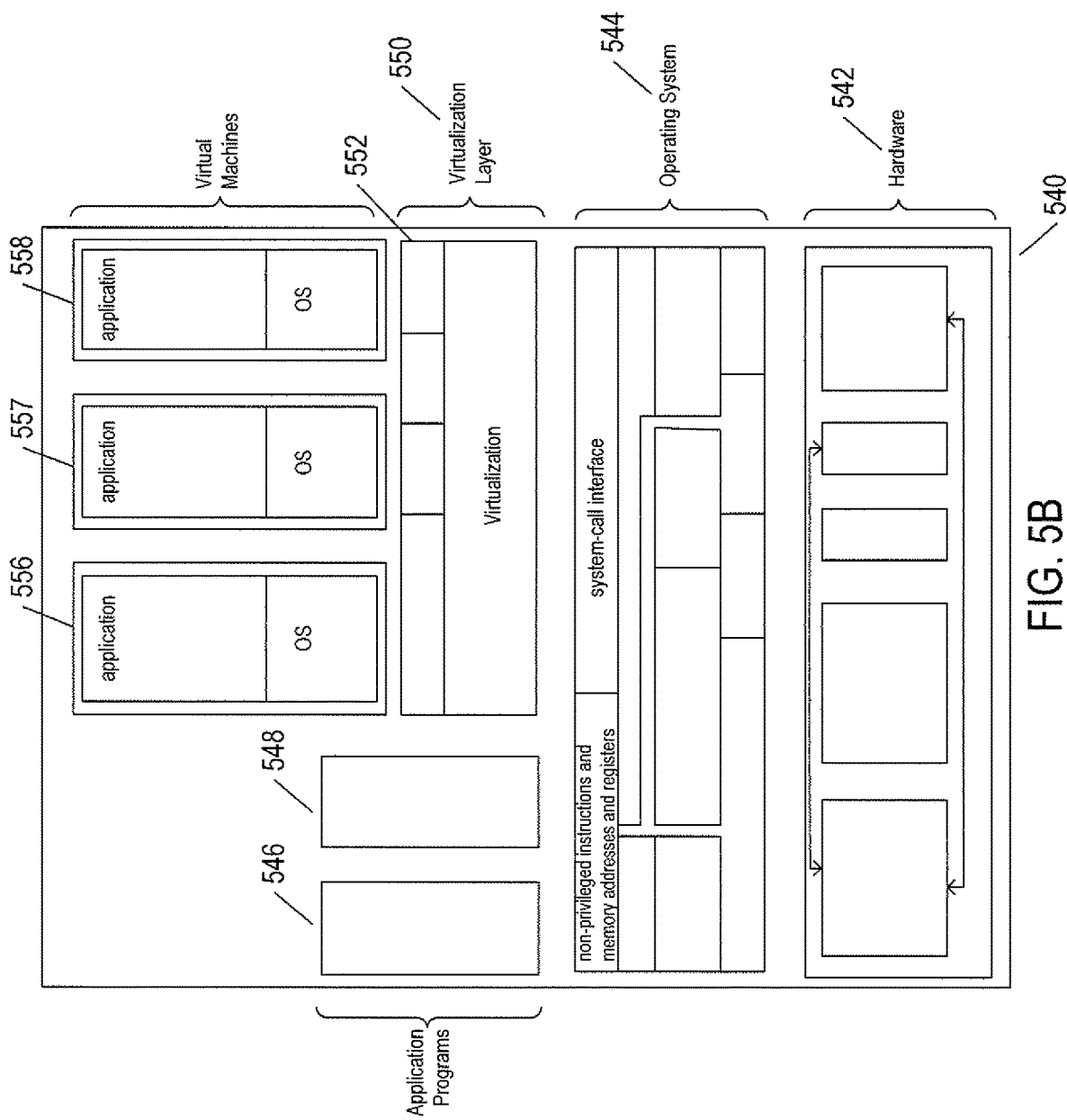

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, similar to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

While the traditional virtual-machine-based virtualization layers, described with reference to FIGS. 5A-B, have enjoyed widespread adoption and use in a variety of different environments, from personal computers to enormous distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system, OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as name space support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 5D:
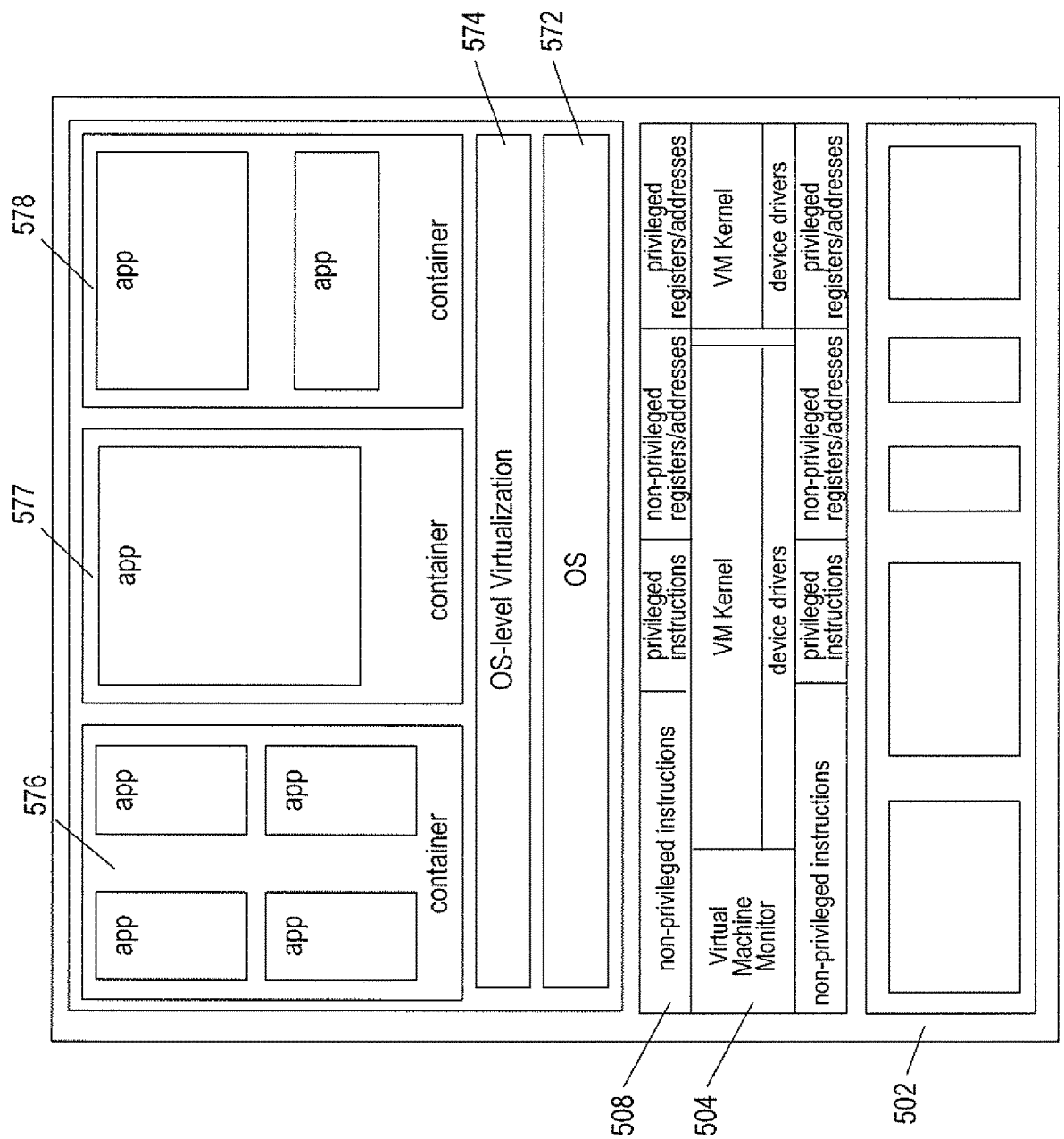

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

In FIGS. 5A-D, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
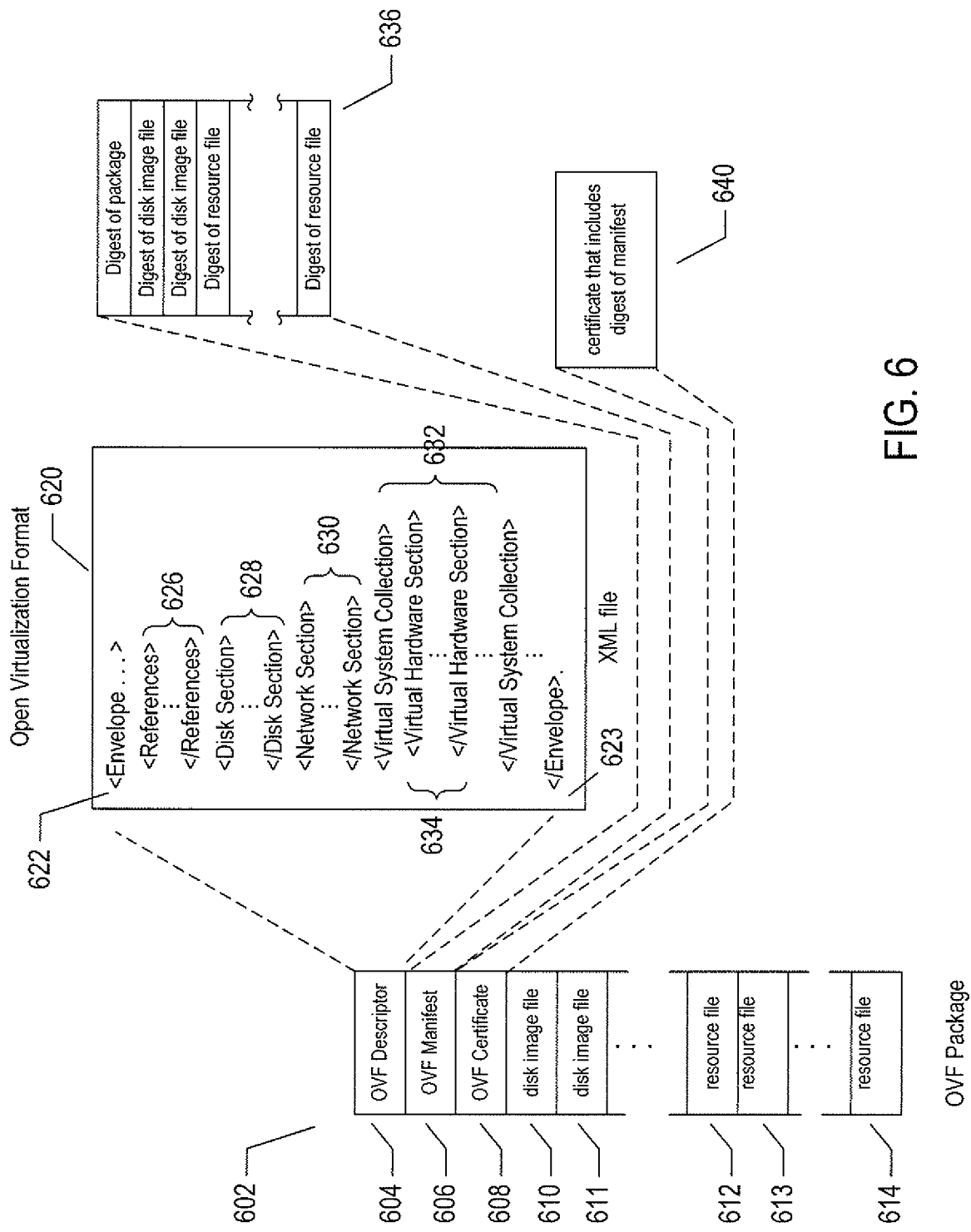
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
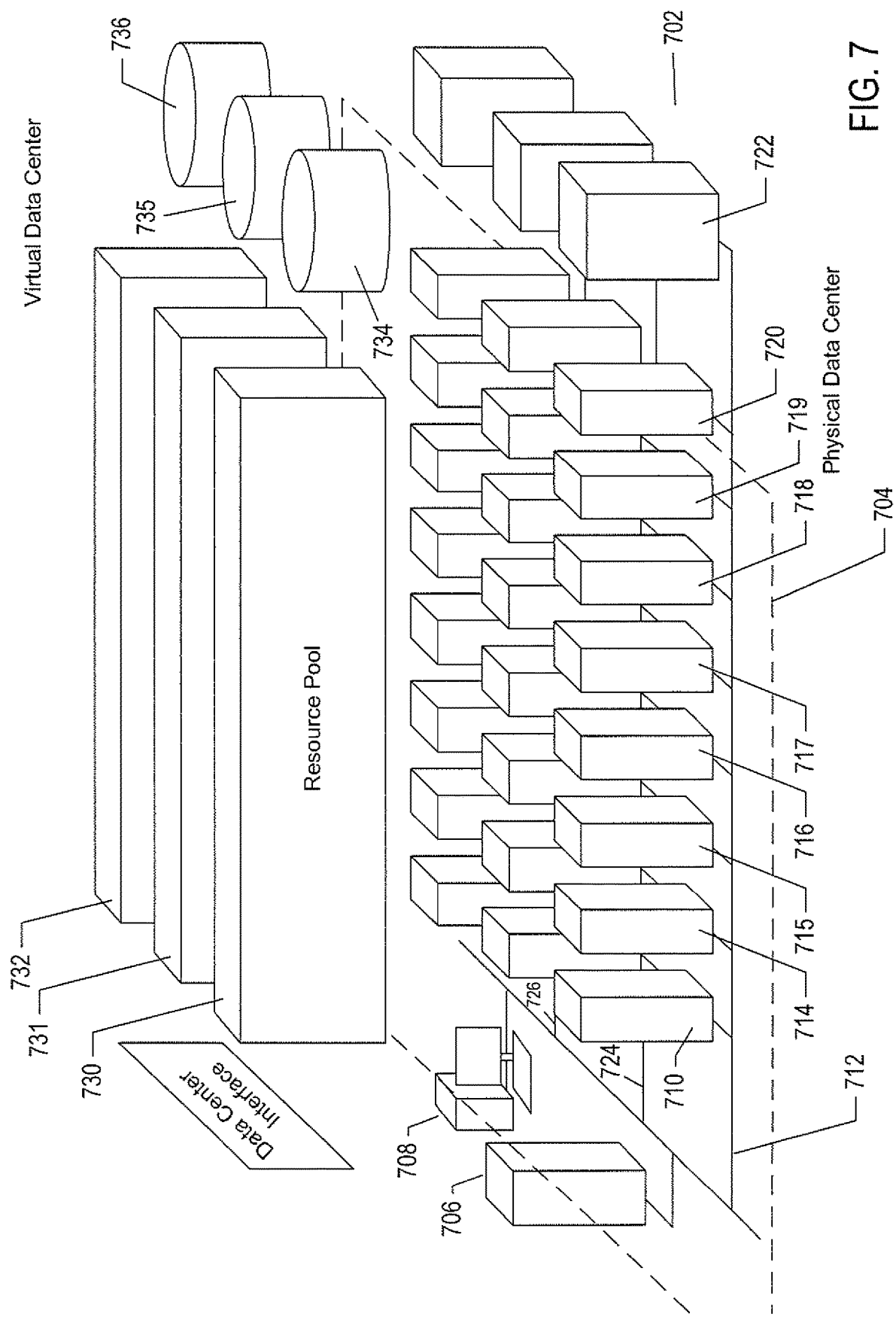
FIG. 7 illustrates virtual data centers provided as an abstraction of underlying physical-data-center hardware components.

FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
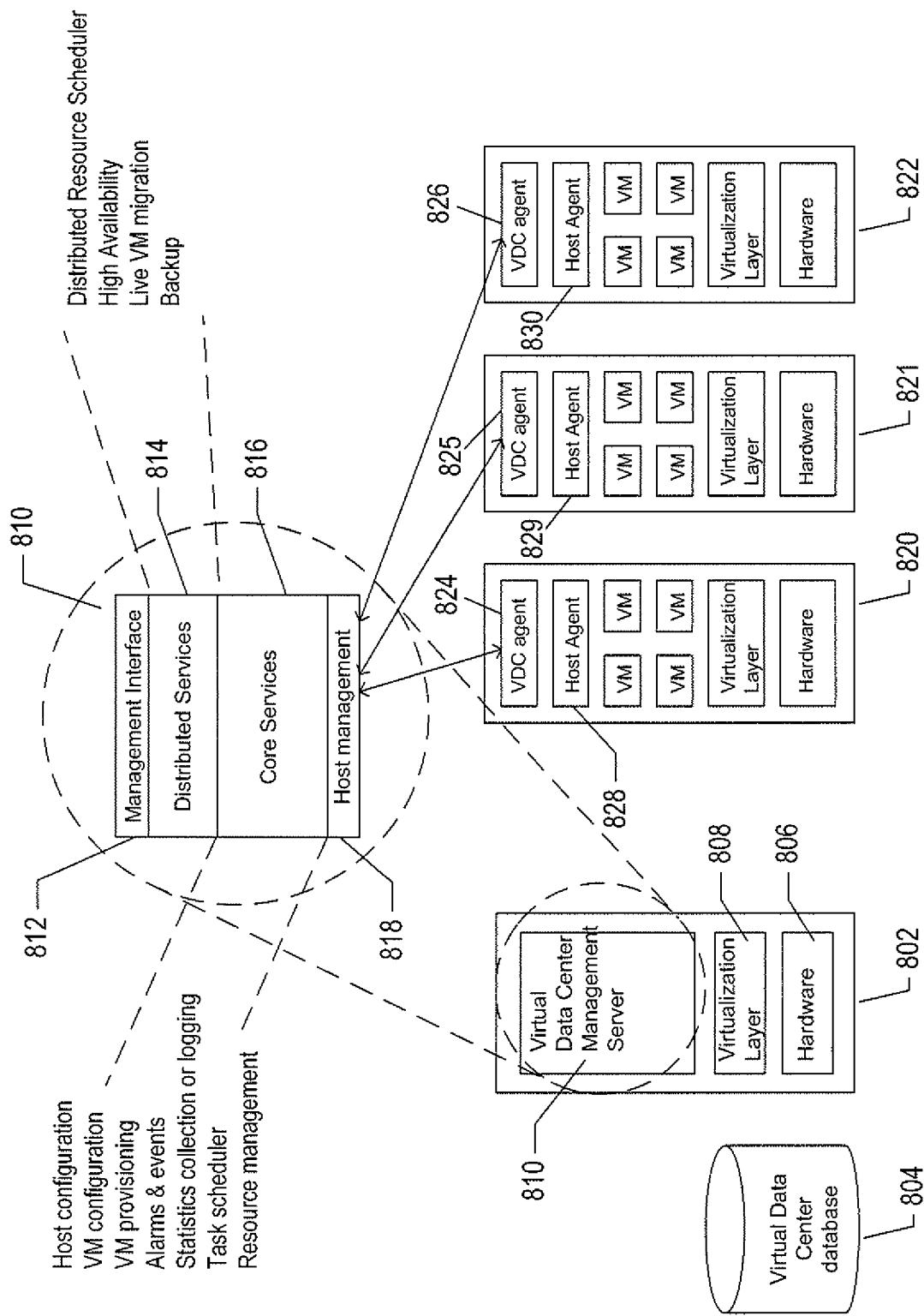
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808, and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloudcomputing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
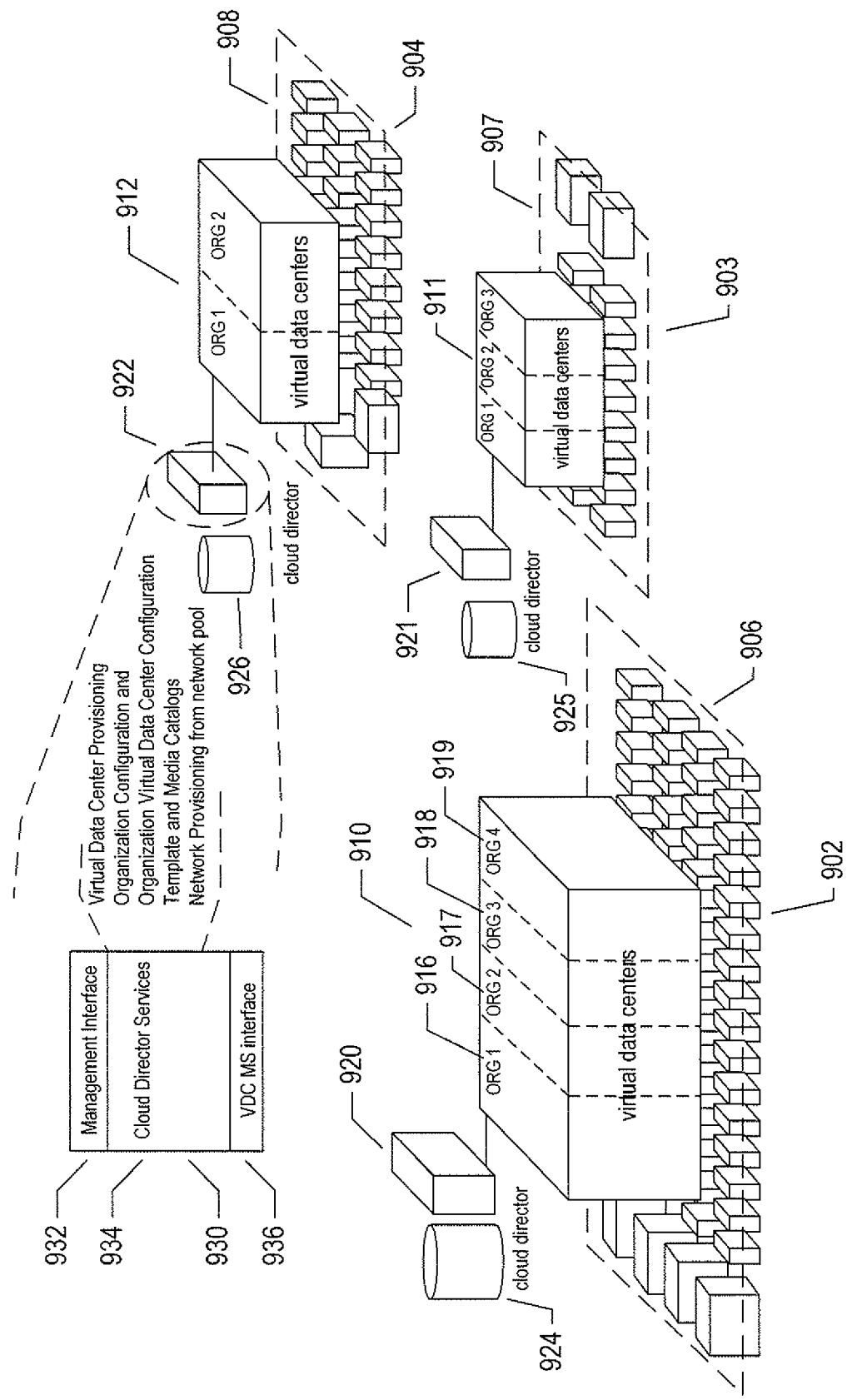
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
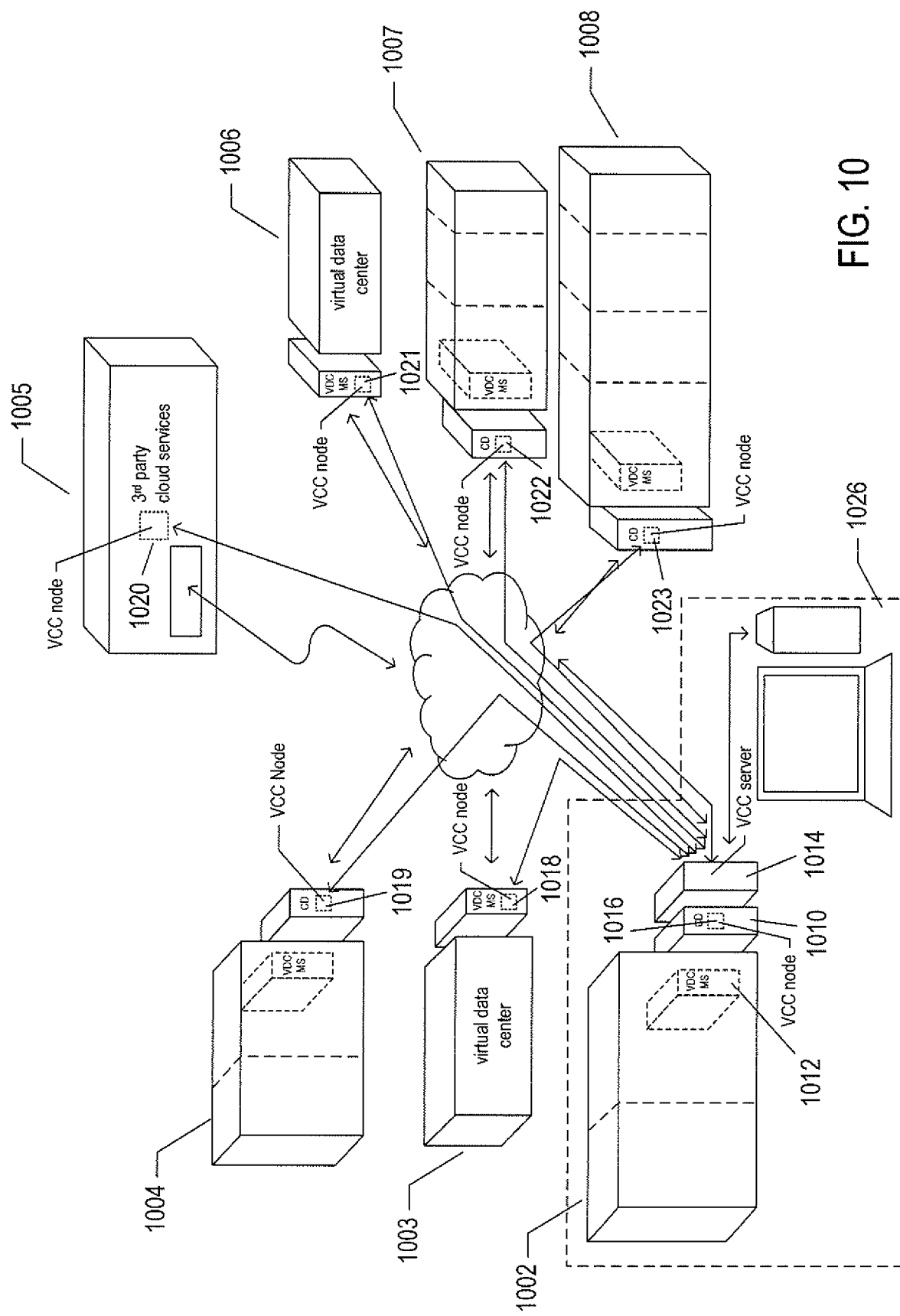
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Distributed-Search Methods and Subsystems

The current document is directed to distributed-search methods and subsystems that provide for efficient distributed searches within distributed computer systems. The distributed searches are initiated by distributed-search participants, which may be any type of processor-controlled device that supports access to a distributed-search application programming interface ("API") or graphical user interface ("UI"). In a described implementation, the distributed-search subsystem comprises one or more local instances and one or more centralized distributed-search engines. In the described implementation, local instances execute as web-application plug-ins within one or more virtual machines of a management subsystem. However, many alternative implementations are possible, including standalone applications and even hardware appliances. The local instances support the distributed-search API and/or UI, store local-instance data to support the distributed-search API and/or UI, and exchange request messages and response messages with the one or more centralized distributed-search engines to initiate distributed searches, add attributes to a set of centrally stored attributes, and manage operation of the distributed-search subsystem. The one or more centralized distributed-search engines communicate with local instances, centrally store various types of distributed-search-subsystem data, and carry out distributed searches on behalf of requesting local instances, maintaining an active search context for each search.

Entities for which searches are carried out can be of many different types, from information and data to hardware components and subsystems, automated services, products, remote computer systems connected to the distributed computer system, human users of those systems, and various types of computers, information, devices, and information accessible to the remote computer systems. The entities are characterized by attribute/value pairs. For example, a product might be characterized by the attribute/value pairs: price/$105; shipping_cost/$3.95; shipping_time/3-5 days; SKU/AN763354. As another example, a computational resource might be characterized by the attribute/value pairs: memory/2 GB; processor_bandwidth/1.2 GHz; network_bandwidth/100 MB\sec. Search results may include the values for one or more attributes as well as identifying information for providers, network addresses, and additional information.

Searches are parameterized by attribute/value pairs. These parameters may specify a scope for the search, minimum requirements for successful responses, search termination conditions, and many other operational parameters that allow searches to accurately tailored to user and participant needs. Participants may also be characterized by attribute/value pairs. For example, participants may be characterized by ratings that reflect past performance in supplying requested products and services.

Figure 11A:
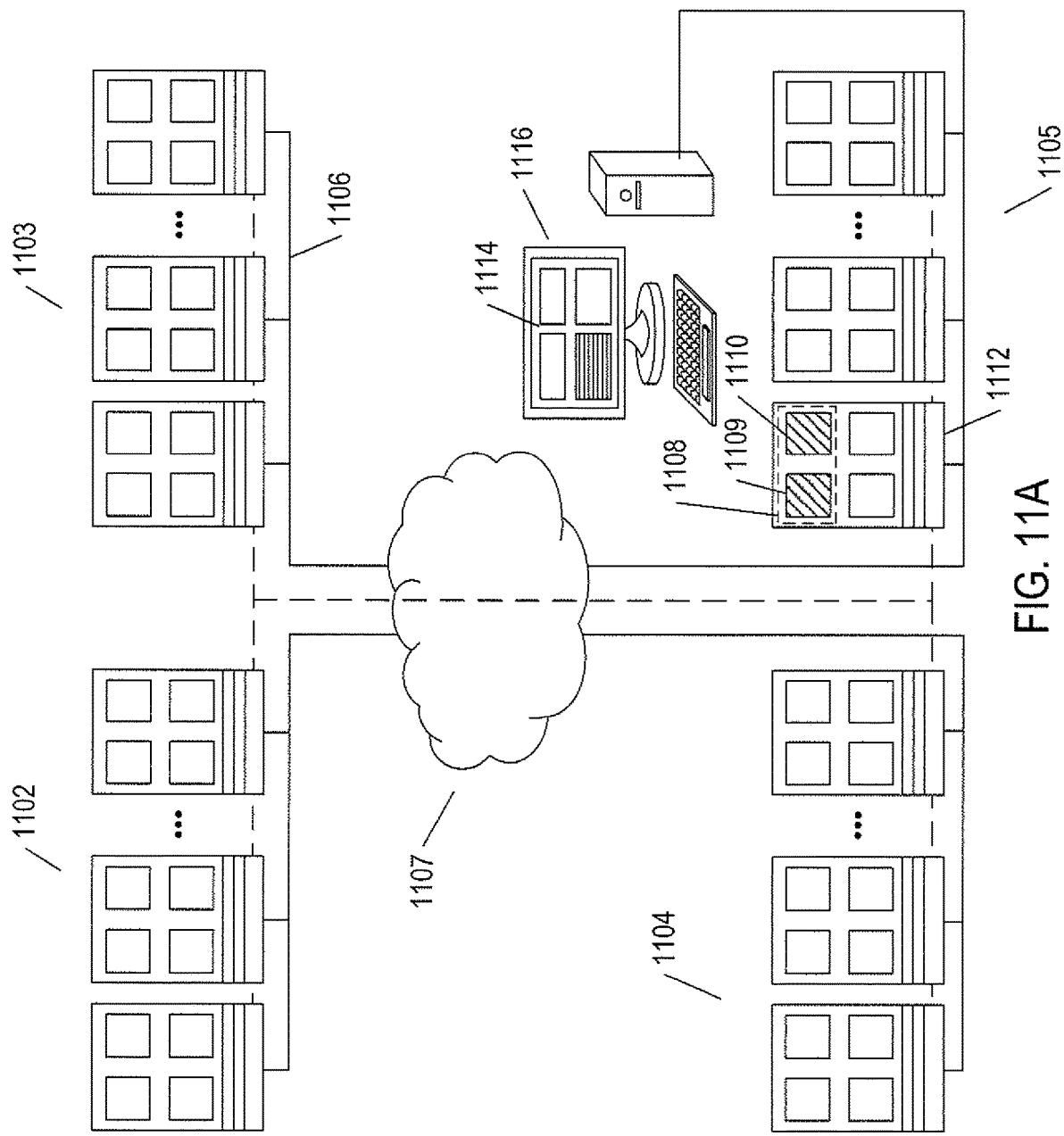
FIGS. 11A-G illustrate components and general operation of the distributed-search methods and subsystems to which the current document is directed.

FIGS. 11A-G illustrate components and general operation of the distributed-search methods and subsystems to which the current document is directed. FIG. 11A uses illustration conventions, which are next described, that are subsequently used in FIGS. 11C-G. A large distributed computer system is represented, in FIGS. 11A and 11B-G, by four sets 1102-1105 of computers, each set representing a virtualized-server cluster, virtual data center, or group of virtual data centers. In large distributed computer systems, there may be tens, hundreds, or more server clusters and virtual data centers linked together by many layers of internal and external communications systems. In FIG. 11A and FIGS. 11B-G, local internal communications are represented by interconnecting lines or channels, such as local network 1106 within server cluster or virtual data center 1103, and one or more wide-area networks or other external communications systems are represented by cloud 1107. The distributed-computer-system representation used in FIGS. 11A and 11B-G is abstracted to provide for concise and simple illustration of the currently disclosed distributed-search methods and subsystems.

In the example distributed computer system shown in FIG. 11A and FIGS. 11B-G, a management subsystem is implemented as a vApp 1108 including two or more virtual machines 1109-1110 within a management server 1112 within a server cluster or virtual data center 1105. The management subsystem displays a management user interface 1114 on one or more management consoles 1116 used by system managers or administrators to manage operation of a server cluster or virtual data center. Each server cluster or virtual data center, such as server clusters or virtual data centers 1102-1104, may also include a management subsystem, such as the management subsystem 1108-1110 within server cluster or virtual data center 1105. In certain implementations, a management subsystem may span two or more server clusters or virtual data centers.

The management subsystem provides a comprehensive server cluster or virtual data center management interface to system administrators. Through the management user interface, system administrators specify operational parameters that control facilities that store, manage, and deploy vApp and VM templates, facilities that provide for high-availability virtual-machine execution, tools for migrating executing VMs among servers and execution environments, VM replication, and data backup and recovery services.

Figure 11B:
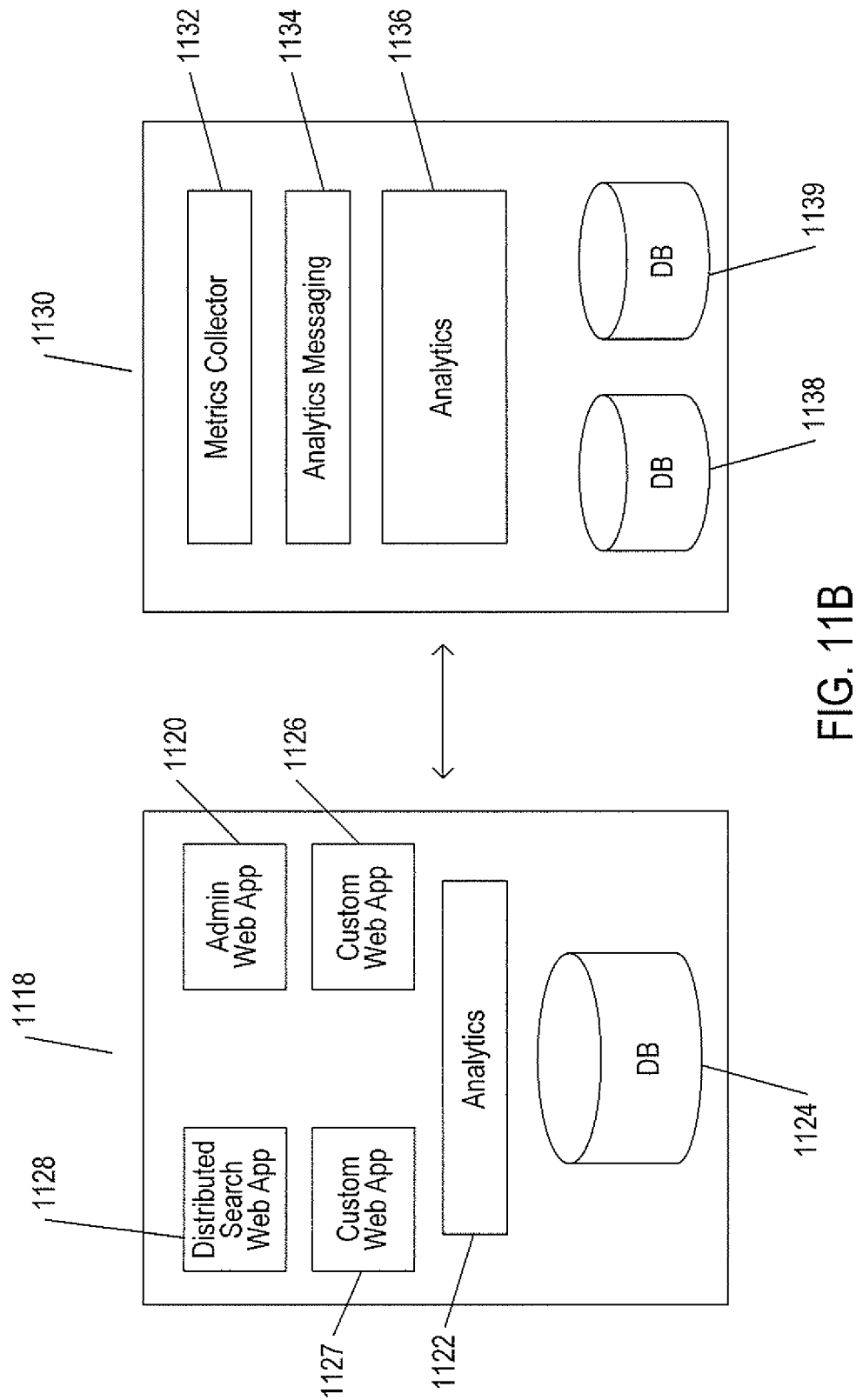

FIG. 11B illustrates one implementation of a high-level architecture of the management subsystem 1108-1110 discussed above with reference to FIG. 11A. In the management subsystem, a first virtual machine 1118 is responsible for providing the management user interface via an administrator web application 1120, as well as compiling and processing certain types of analytical data 1122 that are stored in a local database 1124. In addition, the first virtual machine runs numerous custom web applications 1126-1127 that provide additional functionalities accessible through the management user interface. The first virtual machine also provides an execution environment for a distributed-search web application 1128 that represents a local instance of the distributed-search subsystem within a server cluster, virtual data center, or some other set of computational resources within the distributed computer system. A second virtual machine 1130 is primarily concerned with collecting metrics 1132 from various types of components, subcomponents, servers, network-storage appliances, and other components of the distributed computing system via analytics messaging 1134 and then analyzing the collected metrics 1136 to provide continuous representations of the status and state of the distributed computer system, to automatically identify various types of events and problems that are addressed automatically, semi-automatically, or manually by system administrators, and to provide additional types of monitoring and analysis, the results of which are stored in several local databases 1138-1139. In alternative implementations, other types of virtual execution environments may be used to support execution of the web applications or other implementations of the a local instance of the distributed-search subsystem, including containers, discussed above.

Figure 11C:
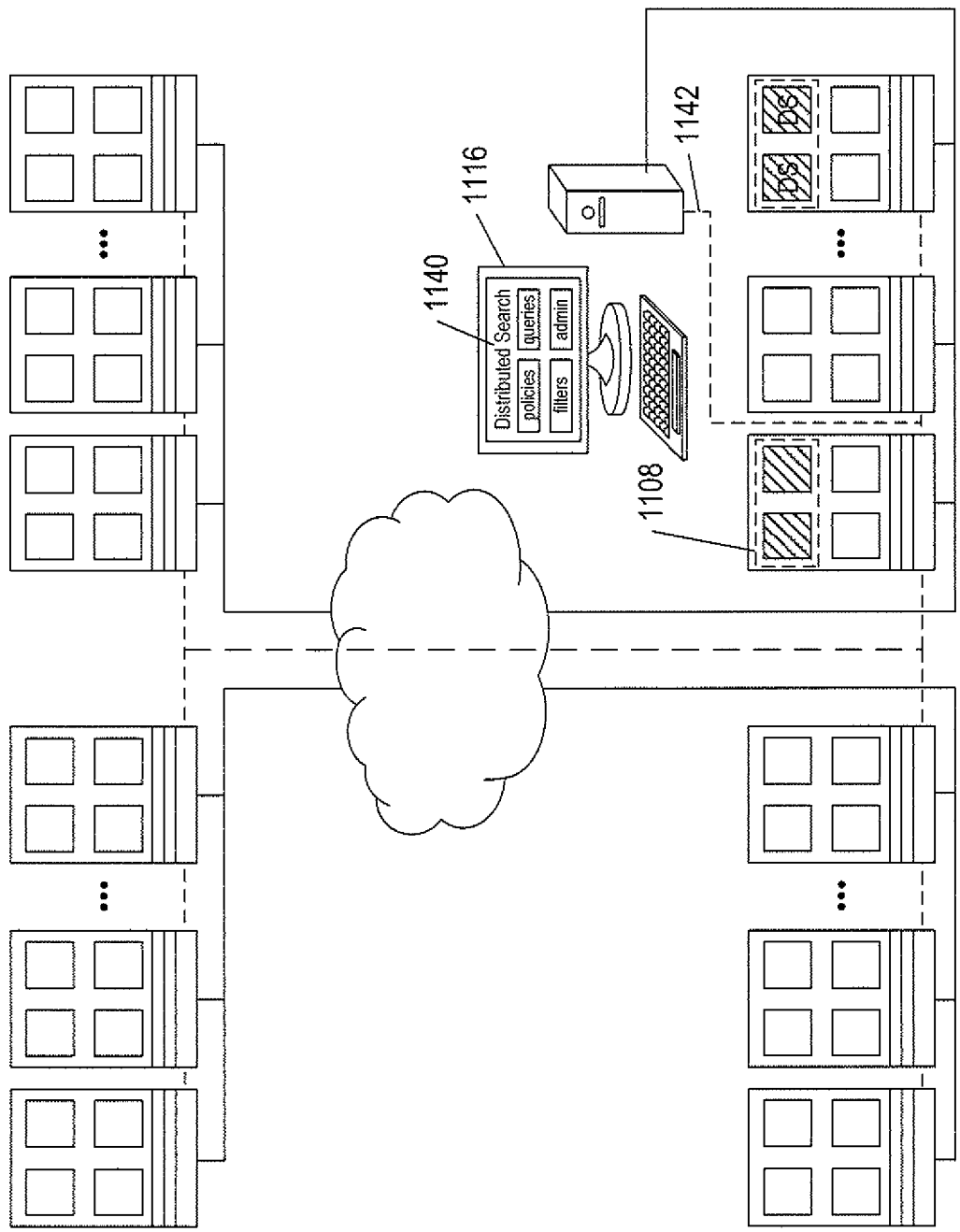

As shown in FIG. 11C, the local instance of the distributed-search subsystem (1128 in FIG. 11B) is invoked, in one implementation, through the management user interface to provide a distributed-search user interface 1140 to a system administrator or, in other cases, to provide a distributed-search application programming interface ("API") to various automated management and computational-resource-distribution subsystems within the distributed computer system. Communication between the management subsystem 1108 and the system console 1116 is provided, in one implementation, over a secure virtual management network within the distributed computer system, represented in FIG. 11A and FIGS. 11B-G by dashed lines, such as dashed line 1142. The distributed-search user interface 1140 provides facilities for the creation and storage of search policies, filters, and search queries, further discussed below. The distributed-search user interface also provides various types of administration operations and functionalities. A user launches searches through the distributed-search user interface and automated subsystems launches searches through a distributed-search API, both provided by a local instance of the distributed-search subsystem. A search initiated by specifying filters, policies, and search-result evaluation criteria previously created and stored through the distributed-search user interface or distributed-search API.

Figure 11D:
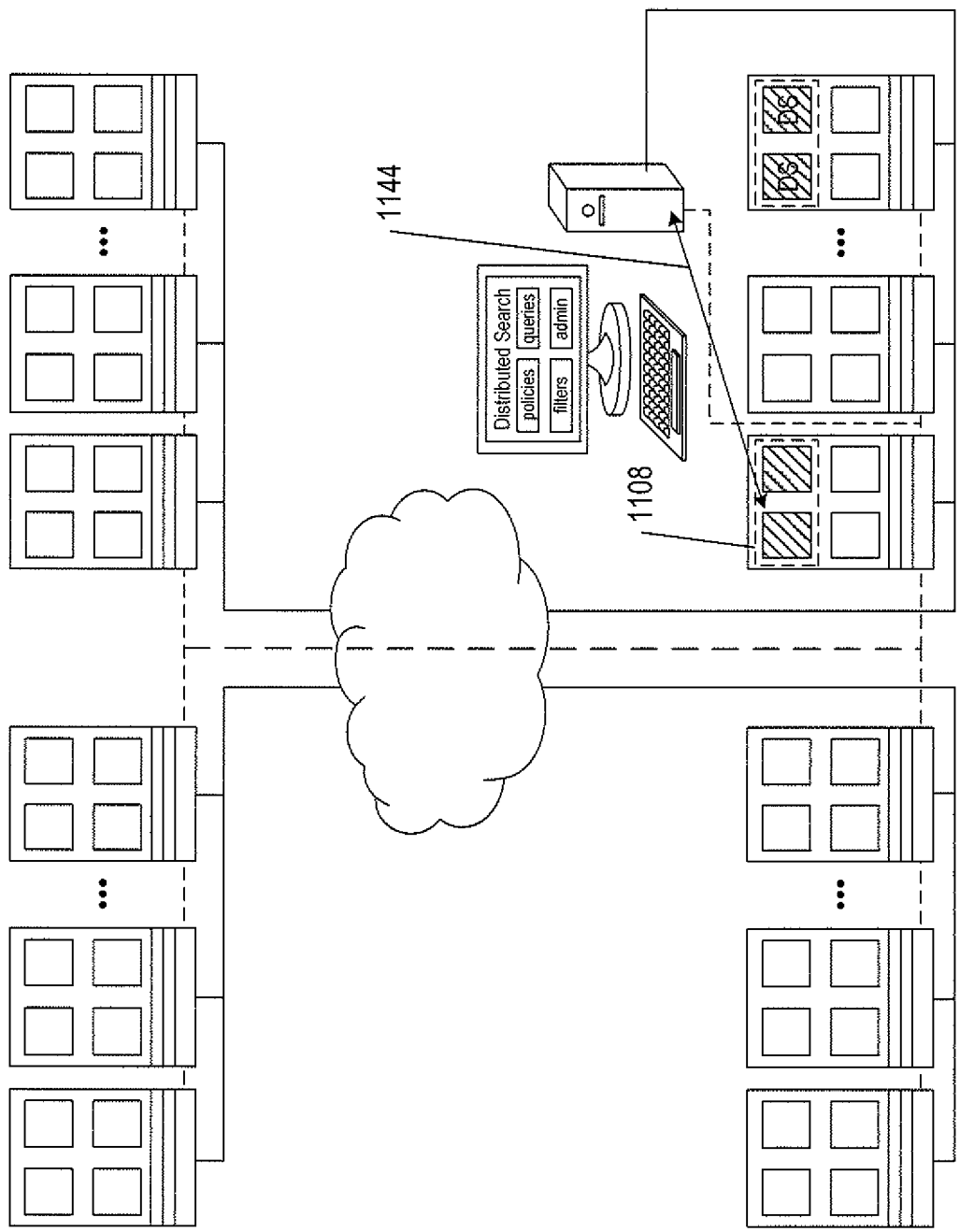
Figure 11E:
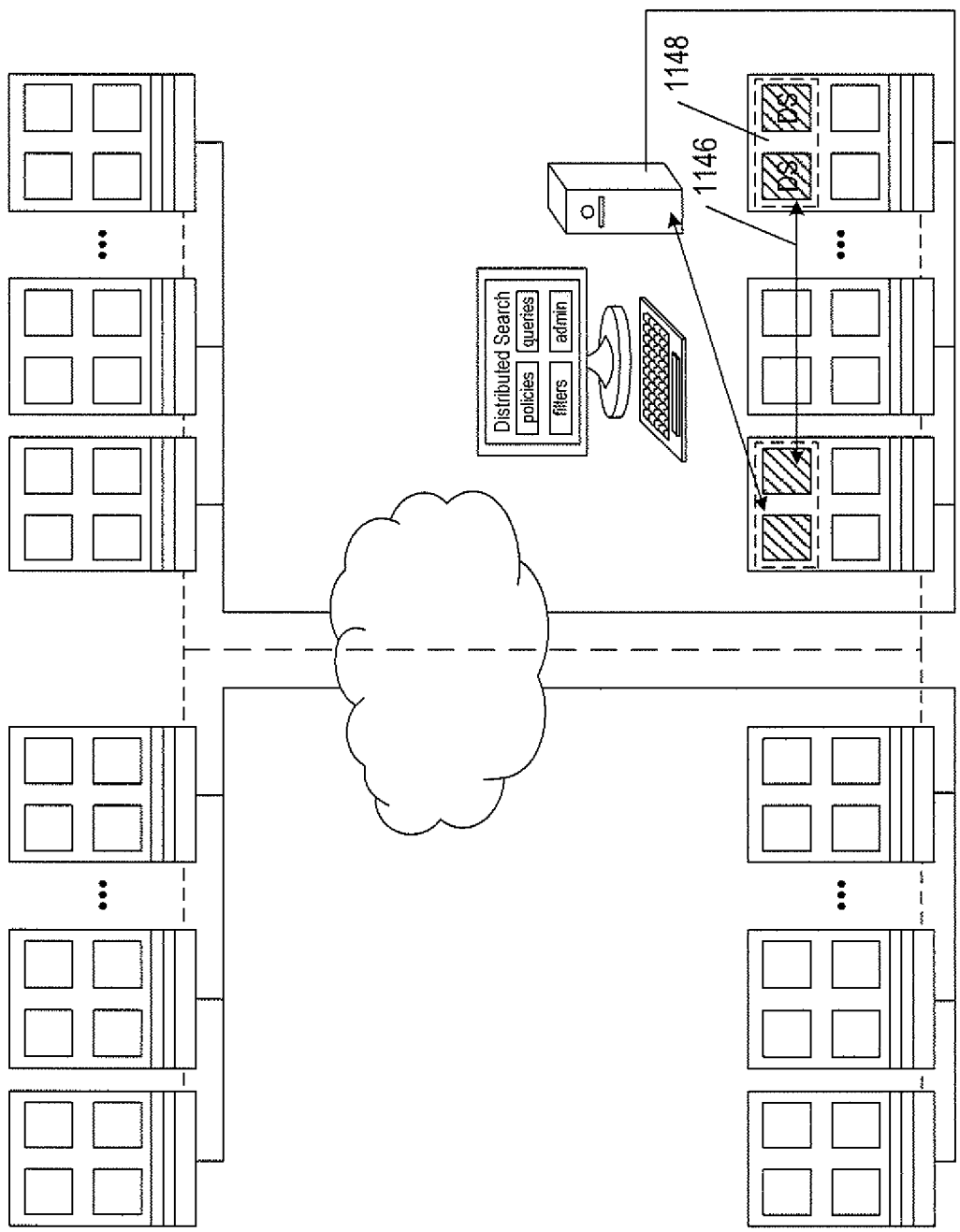
Figure 11F:
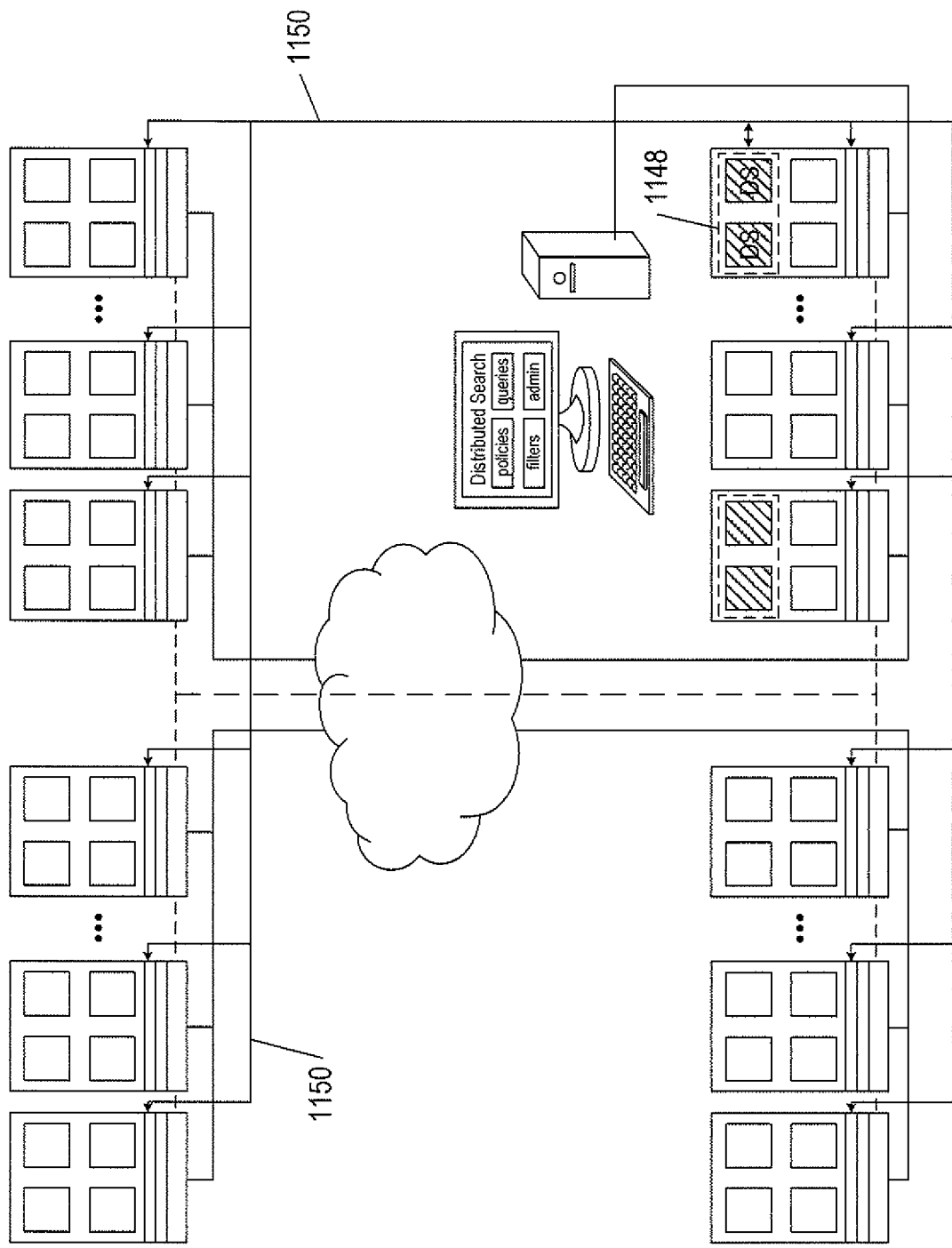
Figure 11G:
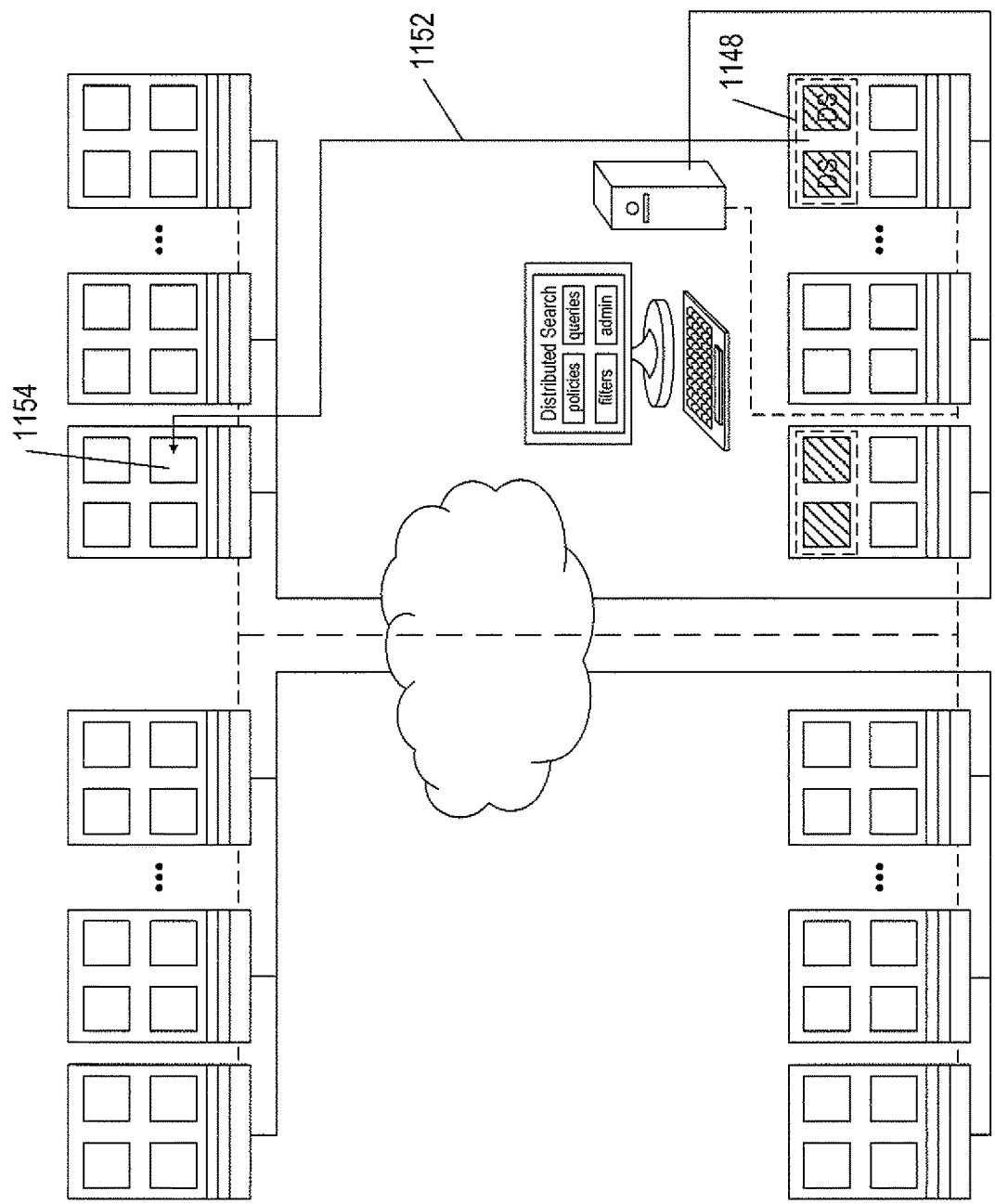

As shown in FIG. 11D, a search is initiated by the transmission of a search-initiation request, from the distributed-search user interface or through a remote call to the distributed-search API 1144, to a local instance of the distributed-search subsystem within the management subsystem 1108. As shown in FIG. 11E, the local instance of the distributed-search subsystem then prepares a search-request message that is transmitted 1146 to a centralized distributed-search engine 1148, in one implementation implemented as a vApp containing one or more centralized-distributed-search-engine virtual machines that runs within a server or other computer system within the distributed computer system. The centralized distributed-search engine, as shown in FIG. 11F, transmits dynamic-attribute-value requests to each of a set of target participants within the distributed computing system, as represented by arrows emanating from the distributed-search engine 1148 and directed to each of a particular component or layer within the computer systems of the distributed computer system. The transmission may occur over a period of time in which batches of dynamic-attribute-value requests are transmitted at intervals, to avoid overloading communications subsystems. The set of target participants is obtained by using filters included within the search request to evaluate centrally stored static attribute values for entities within the distributed computer system, as discussed, in detail, below. Initial filtering avoids transmission of messages to entities incapable of satisfying search-request criteria. Note that the target participants may be any type or class of distributed-computing-system component or subsystem that can support execution of functionality that receives dynamic-attribute-value-request messages from a centralized-distributed-search engine. In certain cases, the target participants are components of management subsystems, such as local instances of the distributed-search subsystem (1128 in FIG. 11B). However, target participants may also be virtualization layers, operating systems, virtual machines, applications, or even various types of hardware components that are implemented to include an ability to receive attribute-value-request messages and respond to the received messages. Finally, as shown in FIG. 11G, the centralized distributed-search engine 1148 receives responses from the target participants within the distributed computer system and continuously evaluates the responses to maintain a small set of best responses. In many cases, there may be significant periods of time between reception of a dynamic-attribute-value request by a target participant and sending of a response by the target participant. When termination criteria for the search are satisfied, and the search is therefore terminated, the set of best responses to the transmitted dynamic-attribute-value-request messages are first verified, by a message exchange with each target participant that furnished the response message, and are then transmitted 1152 from the centralized-distributed-search engine to one or more search-result recipients 1154 specified in the initial search request. A search-result recipient may be the local instance of the distributed-search subsystem that initiated the distributed search, but may alternatively be any other component or entity or set of components or entities of the distributed computer system that supports reception of a distributed search-results message.

Figure 12A:
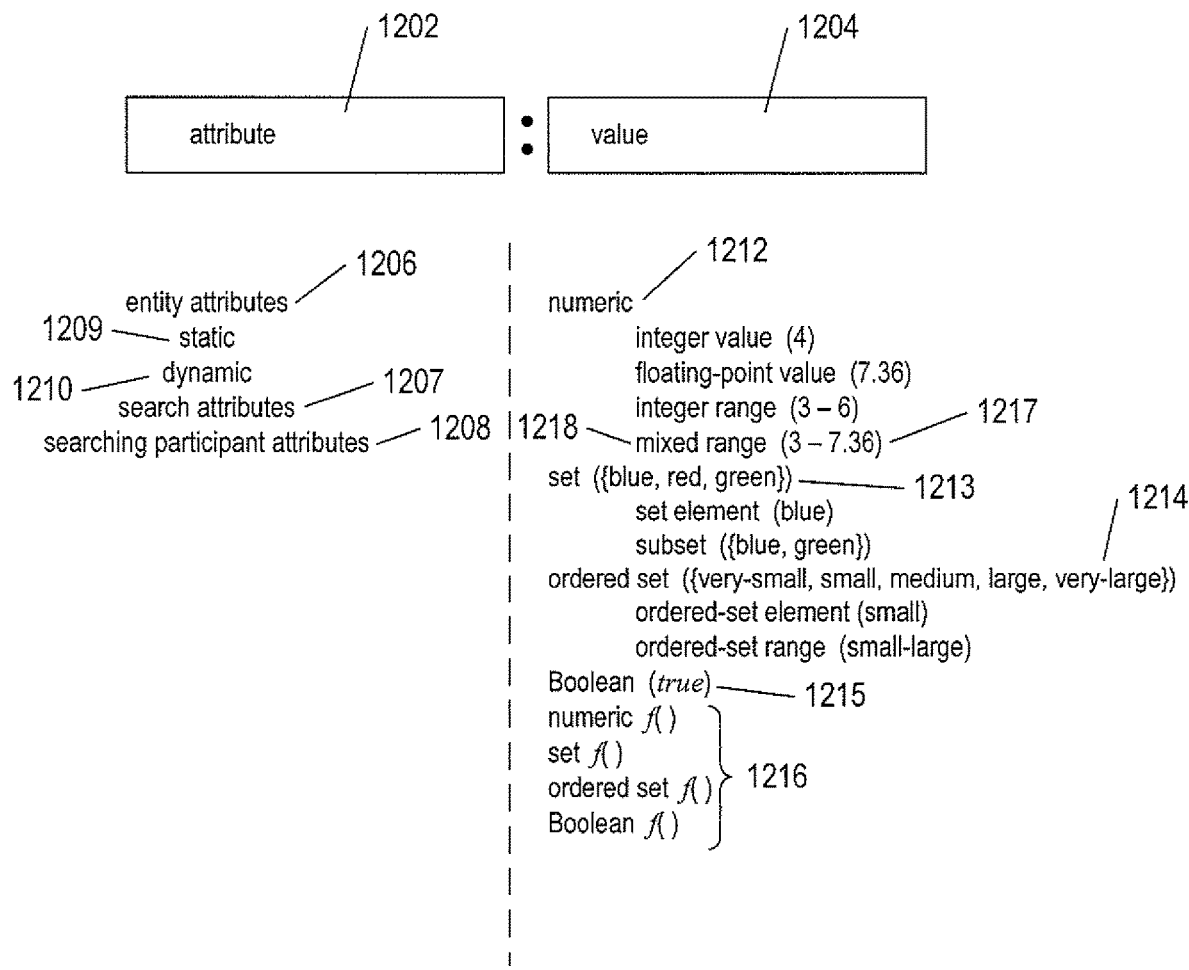
Figure 12B:
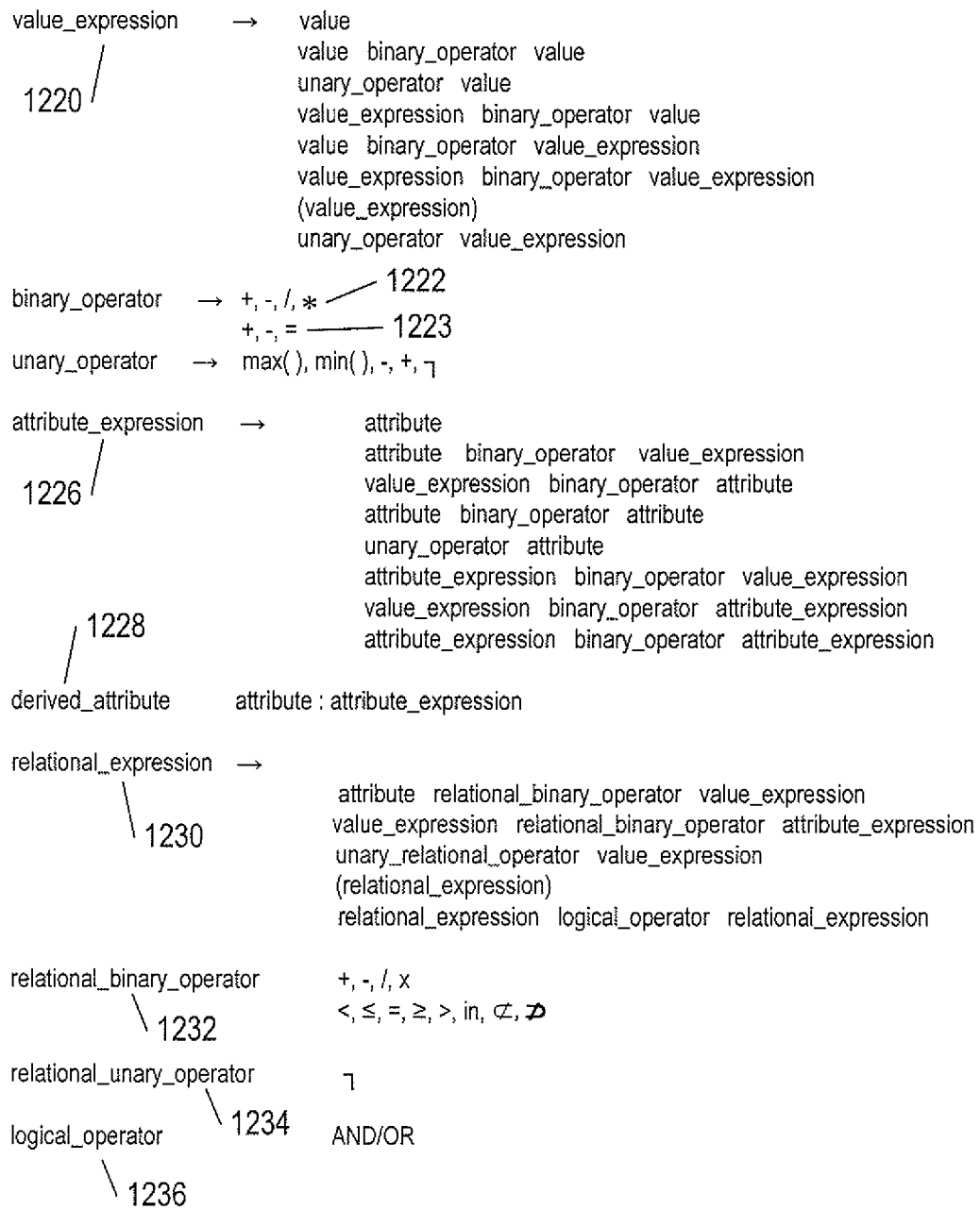

FIGS. 12A-C illustrate certain of the information and data entities used within the currently disclosed distributed-search methods and subsystems. The distributed search is used to identify entities managed by, contained within, or accessible to distributed-search participants. These entities are characterized by attribute/value pairs. An entity may be a participant, a service, information, distributed-computer-system components, remote computers connected through communications media with the distributed computer system, remote-computer users, or any of many other types of entities that can be characterized by attribute values and that are desired to be identified through distributed searches.

FIG. 12A illustrates an attribute/value pair. The attribute 1202 is an alphanumeric string that identifies a particular attribute within a universal set of attributes used by the distributed-search methods and subsystems. Attributes are, in many implementations, centrally stored and managed by one or more centralized-distributed-search engines. An attribute is instantiated by being associated with one or more any of the above-mentioned types of entities. Instantiated attributes are associated with values. In this respect, an attribute is similar to a variable used in programming-language statements. The variable has a name, is instantiated within a particular scope comprising the routines from which it is visible, and an instantiated variable can store any of various different values within the value domain of the variable.

In the currently disclosed distributed-search methods and subsystems, three types of attributes are generally encountered: (1) entity attributes 1206, which are associated with entities that are identified by searches; (2) search attributes 1207, which identify particular parameters for a given distributed search; and (3) search-participant attributes 1208, which characterize a participant, generally a participant initiating a distributed search. Entity attributes 1206 fall into two classes: (1) static entity attributes 1209, which are entity attributes that, when instantiated, have either constant values or have values that are only infrequently changed and can therefore be pre-fetched and stored by the centralized distributed-search engine in advance of being used during the initiation of distributed searches; and (2) dynamic entity attributes 1210, which are frequently modified and are therefore retrieved, at search time, by transmitting dynamic-attribute-value-request messages to target participants. The value 1204 currently associated with an instantiated attribute 1202 in an attribute/value pair is generally represented by an alphanumeric string. Attribute values can be numeric 1212, elements of a set 1213, elements of an ordered set 1214, Boolean values 1215, or generalized calls to functions or procedures that return numeric, set, ordered-set, or Boolean values 1226. A value may be one of a single element of a set, a subset of a set, single numeric values, or numeric-value ranges. In FIG. 12A, examples of the various different types of values are given in parentheses, such as the example range "[3-7.36]" 1217 provided for the mixed-range subtype 1218 of the numeric 1212 value type.

FIG. 12B shows certain derived types of information and data used by the distributed-search methods and subsystems to which the current application is directed. Values may be combined in value expressions 1220. These are familiar arithmetic and set expressions that include binary arithmetic operators 1222 and binary set operators 1223 as well as various types of arithmetic and set unary operators 1224. Value expressions can be considered to be expressions equivalent to constant values. Similarly, attributes may be combined in attribute expressions 1226 which are equivalent to expressions in programming languages that include variables. When the attributes in an attribute expression are replaced by specific values with which they are associated, the attribute expression is equivalent to a constant value. A derived attribute 1228 is an attribute defined in terms of other attributes. Value expressions can be combined by common relational operators to produce relational value expressions 1230 using relational binary operators 1232, relational unary operators 1234, and logical operators 1236.

FIG. 12C illustrates additional data and information types used in the distributed-search methods and subsystems to which the current application is directed. A filter 1240 is a relational expression that specifies a value or range of values for an attribute. A policy 1242 comprises one or more filters. A search-evaluation expression 1244 is used to evaluate returned dynamic-attribute values from participant search-request responders in order to compute a score for a response, as discussed, in detail, below. A search-evaluation expression comprises one or more evaluators. An evaluator 1246 is either a simple evaluator or a weight/simple-evaluator pair. A simple evaluator 1248 is a minimum-positive attribute or a floor/minimum-positive-attribute pair. A minimum-positive attribute is an attribute having values selected from a numeric or ordered-set value domain that map to a set of numerically increasing values, generally beginning with the value "0." As the value increases, the desirability or fitness of the attribute and its associated value decreases. For example, an attribute "price" may have values in the range [0, maximum_price], with lower prices more desirable than higher prices and the price value 0, otherwise referred to as "free," being most desirable. In general, an attribute that is not a minimally positive can be easily transformed into a derived, minimum-positive-attribute. For example, the attribute "expected lifetime" can be transformed into the derived attribute "early expiration" by: early_expiration:MAXIMUM_LIFETIME−expected_lifetime. A weight is a numeric multiplier and a floor is a numeric or ordered-set value. Weights are used to adjust the relative importance of attributes in search-evaluation expression and a floor is used to set a lowest-meaningful value of an attribute to a value greater than 0, for numeric attributes, or to an ordered-set value greater than the minimum value in the ordered set. A search 1252 is either a search-evaluation expression or a search-evaluation expression and one or more policies.

Figure 13A:
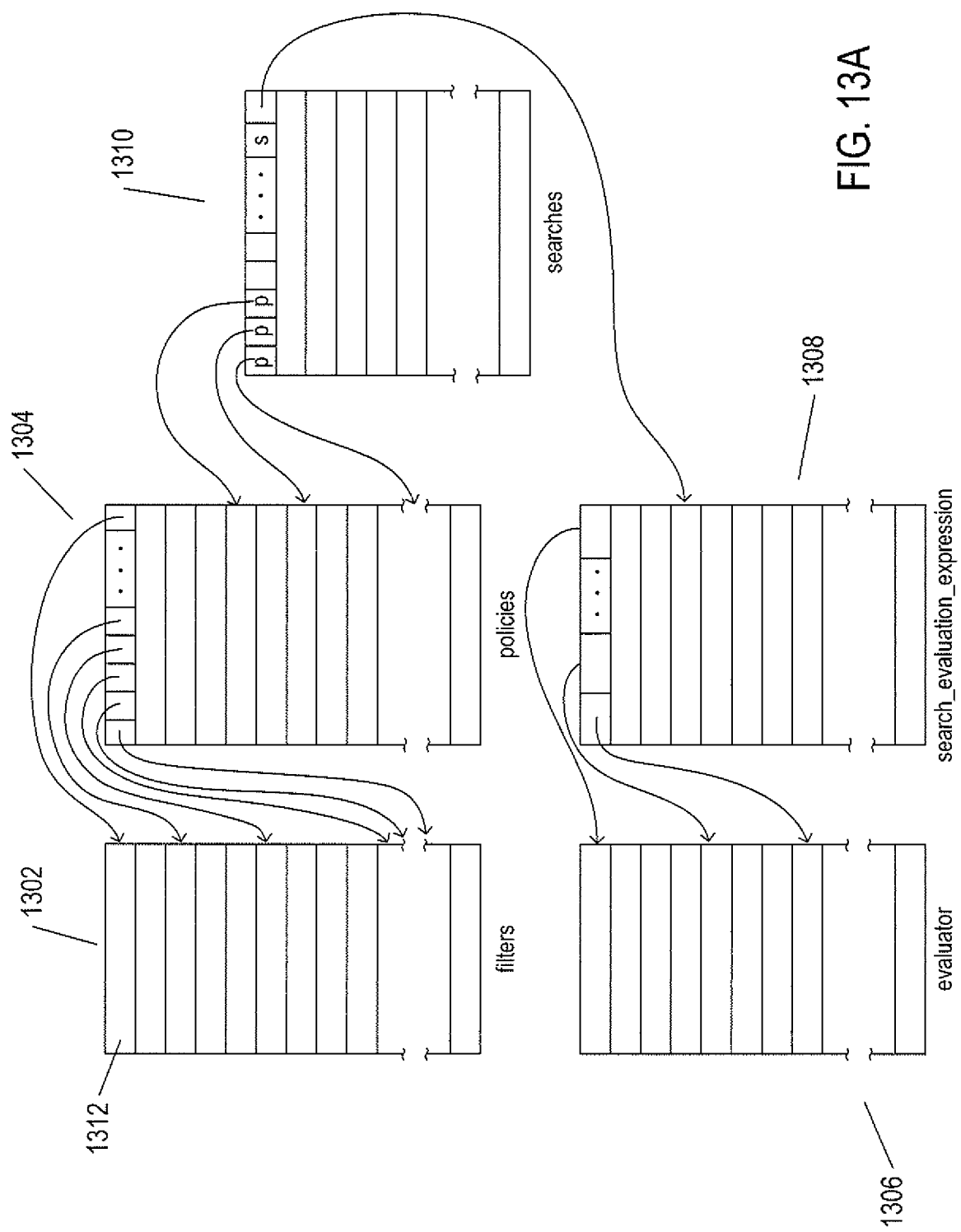
FIGS. 13A-B illustrate certain types of data maintained and used within local instances of the distributed-search subsystem and within a centralized distributed-search engine.
Figure 13B:
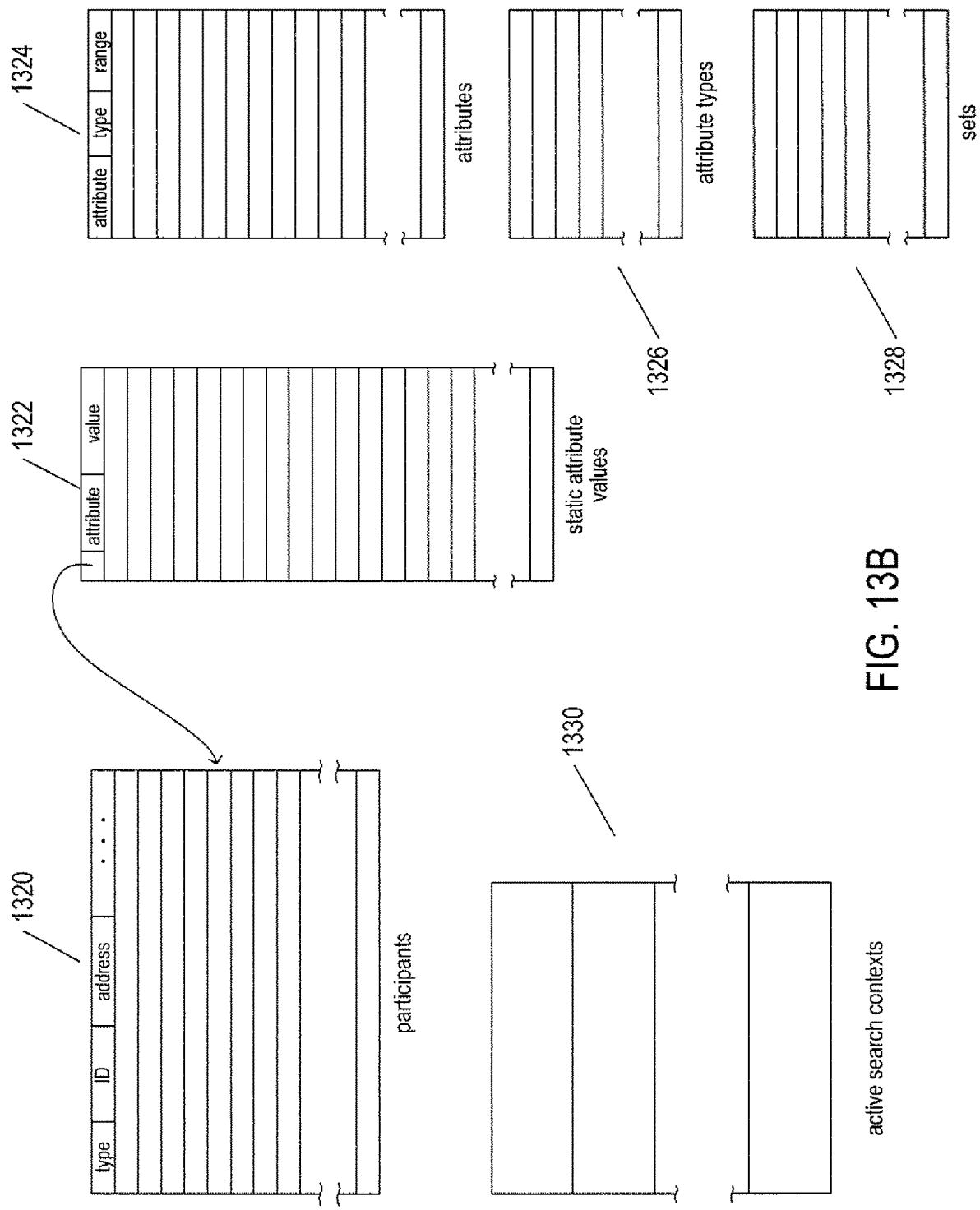

FIGS. 13A-B illustrate certain types of data maintained and used within local instances of the distributed-search subsystem and within a centralized distributed-search engine. As shown in FIG. 13A, a local instance of the distributed-search subsystem stores one or more filters 1302, one or more policies 1304, each policy comprising one or more filters, one or more evaluators 1306, one or more search-evaluation expressions 1308, each search-evaluation expression comprising one or more evaluators, and one or more searches 1310, each search comprising a search-evaluation expression and zero, one, or more policies. In FIG. 13A, each row, such as row 1312, within a set of information entities, such as the set of filters 1302, represents a single information entity of the type of the entity set. The various types of information entities may be stored in relational database tables, including singly or multiply indexed relational database tables, or in any of many other different types of data-storage objects and systems.

Using similar illustration conventions as used in FIG. 13A, FIG. 13B shows the types of information entities stored within the centralized distributed-search engine. The information-entity sets include a set of participants 1320, a set of continuously collected static-attribute/value pairs associated with participants 1322, a set of attributes 1324 and a set of attribute types 1326 which define the attributes that can be used in filters and profiles, a set of sets 1328 from which set values and subsets are selected for set-valued attributes, and a set of active search contexts 1330, each active search context representing a distributed search currently being executed by the distributed-search subsystem.

Figure 14:
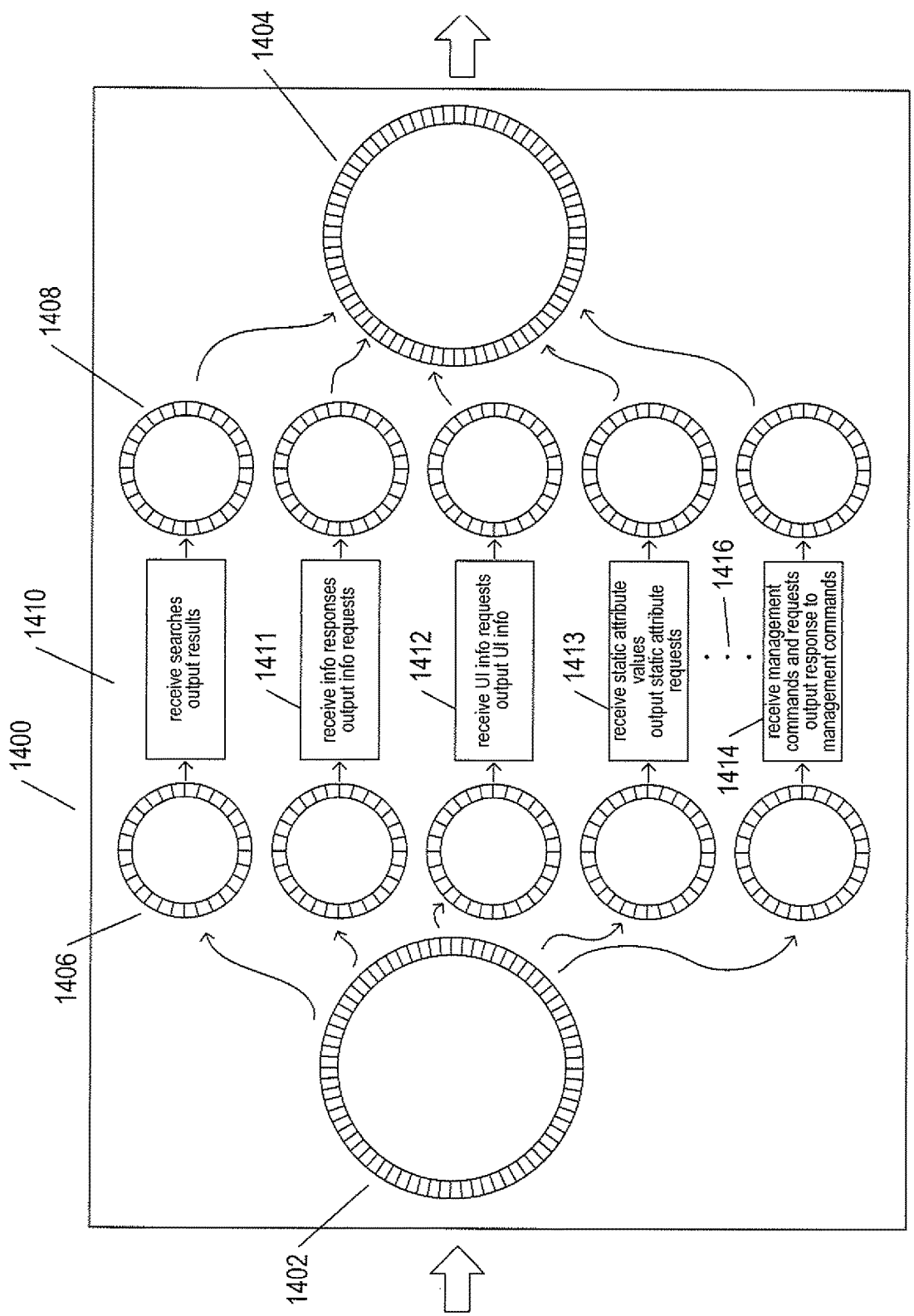
FIG. 14 is a high-level diagram of the centralized distributed-search engine.

FIG. 14 is a high-level diagram of the centralized distributed-search engine. The centralized distributed-search engine receives incoming messages from one or more communications subsystems in an input queue 1402 and outputs messages to an output queue 1404 from which they are extracted and transmitted by the one or more communications subsystems. There are many different types of messages received and transmitted by the centralized distributed-search engine. Different types of messages can be thought of as being distributed from the input queue 1402 to input queues for specific message types, such as input queue 1406 for search requests. Similarly, specific types of output messages are output to specific output queues, such as output queue 1408, from which they are input to the general output queue 1404 for transmission. Various different types of controllers or logic modules 1410-1414 process particular types of input messages and generate particular types of output messages. For example, controller 1410 receives search requests from distributed-search participants and outputs results corresponding to the search requests. Controller 1411 outputs information requests, such as dynamic attribute-value requests, and receives responses to those information requests. Controller 1412 receives UI information requests from local instances of the distributed-search subsystem and outputs responses to those requests. For example, a local instance of the distributed-search subsystem may request a current list of the different types of attributes that can be used to construct filters, policies, and search-evaluation expressions. Controller 1413 outputs static-attribute requests to distributed-search participants and receives response to those requests. Controller 1414 receives management commands and requests from local instances of the distributed-search subsystem and outputs responses to the received commands and requests. Ellipses 1416 indicate that a centralized distributed-search engine may include additional types of controllers that receive and output additional specific types of messages.

Figure 15:
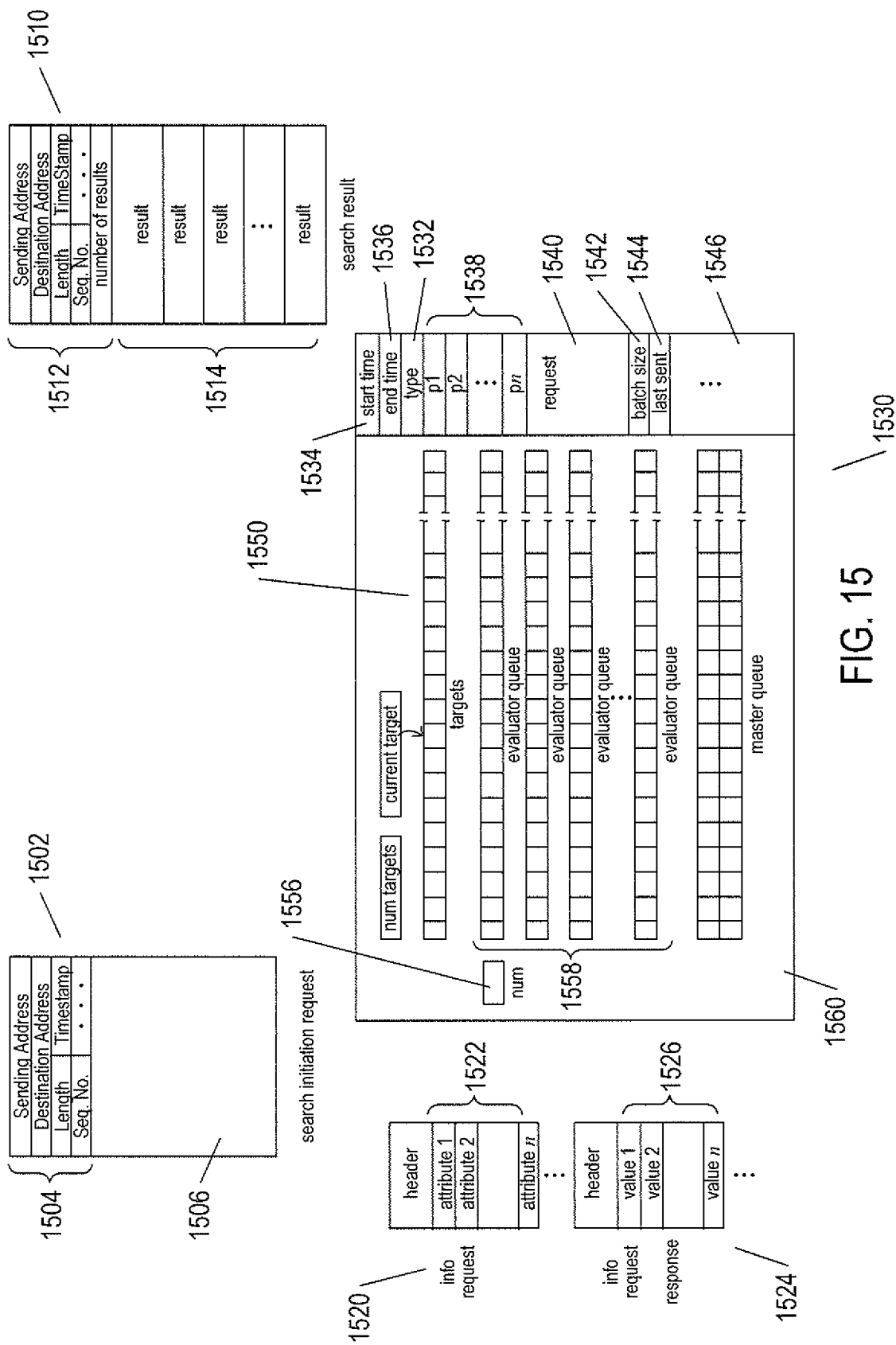
FIG. 15 illustrates various messages and data structures used during execution of a distributed search by the currently disclosed distributed-search subsystem, including an active search context, a search request, a search-request response, and information requests and responses.

FIG. 15 illustrates various messages and data structures used during execution of a distributed search by the currently disclosed distributed-search subsystem, including an active search context, a search request, a search-request response, and information requests and responses. A search-initiation-request message 1502 includes header information 1504 as well as a search-initiation request 1506 that includes a search-evaluation expression and zero, one, or more policies. A search-result message 1510 also includes a header 1512 and one or more search results 1514. Search results identify entities and include attribute/value pairs that characterize the entities. An information request 1520 is sent by the centralized distributed-search engine to target participants requesting current values for a set of dynamic attributes 1522 specified in the information-request message. A response to the information-request message 1524 includes the requested dynamic-attribute values 1526.

An active search context 1530 is a complex data structure maintained by the centralized distributed-search engine for each distributed search currently being executed by the centralized distributed-search engine. In one implementation, an active search context includes an indication of the type of search 1532, a start time for the search 1534, an end time for the search 1536, and a number of additional search parameters 1538. The active search context may store the search-initiation-request message 1540 that initiated the search. The active search context may additionally include a batch size 1542, indicating the number of information requests to be sent in each batch of transmitted information requests and an indication of the time at which the last batch of information-request messages was sent 1544. Ellipses 1546 indicate that many additional parameters and information entities may be stored within an active search context. The active search context may also include a list of target participants 1550 to which information requests need to be directed. These may be participant addresses, expressions from which sets of participant addresses may be computed, or other types of information that can be used to generate addresses for target participants during execution of a distributed search. In addition, the active search context includes an indication of the number of evaluators in the search-evaluation expression 1556, a set of evaluator queues 1558, and a master queue 1560. The evaluator queues maintain an ordered set of returned dynamic-attribute values corresponding to the dynamic attribute associated each evaluator in the search-evaluation expression. The master queue 1560 maintains dynamic-attribute values, scores, and other information for the participants with the best-evaluated responses so far received. Operation of the evaluator queues and master queue is discussed, in great detail, below.

Figure 16A:
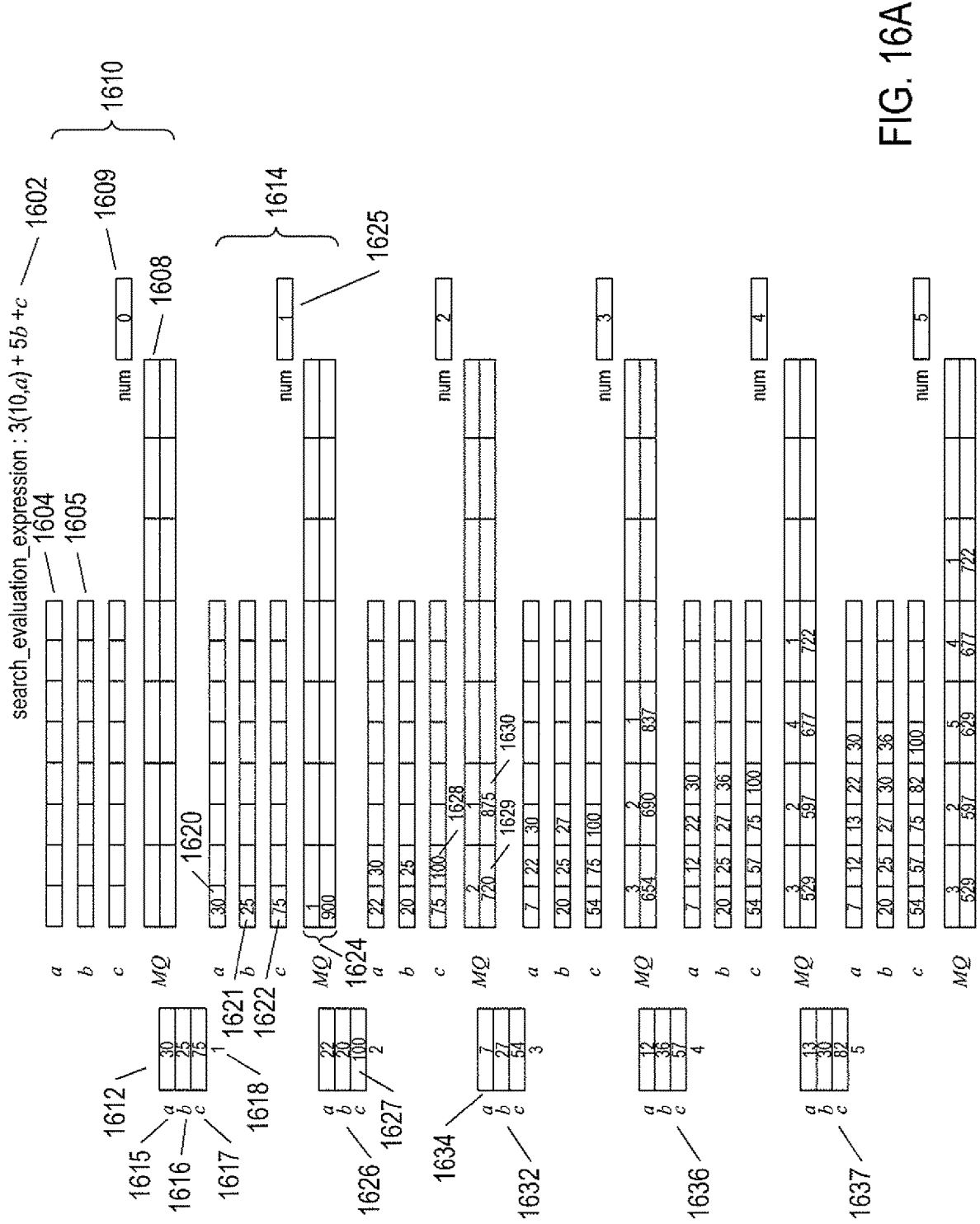
Figure 16B:
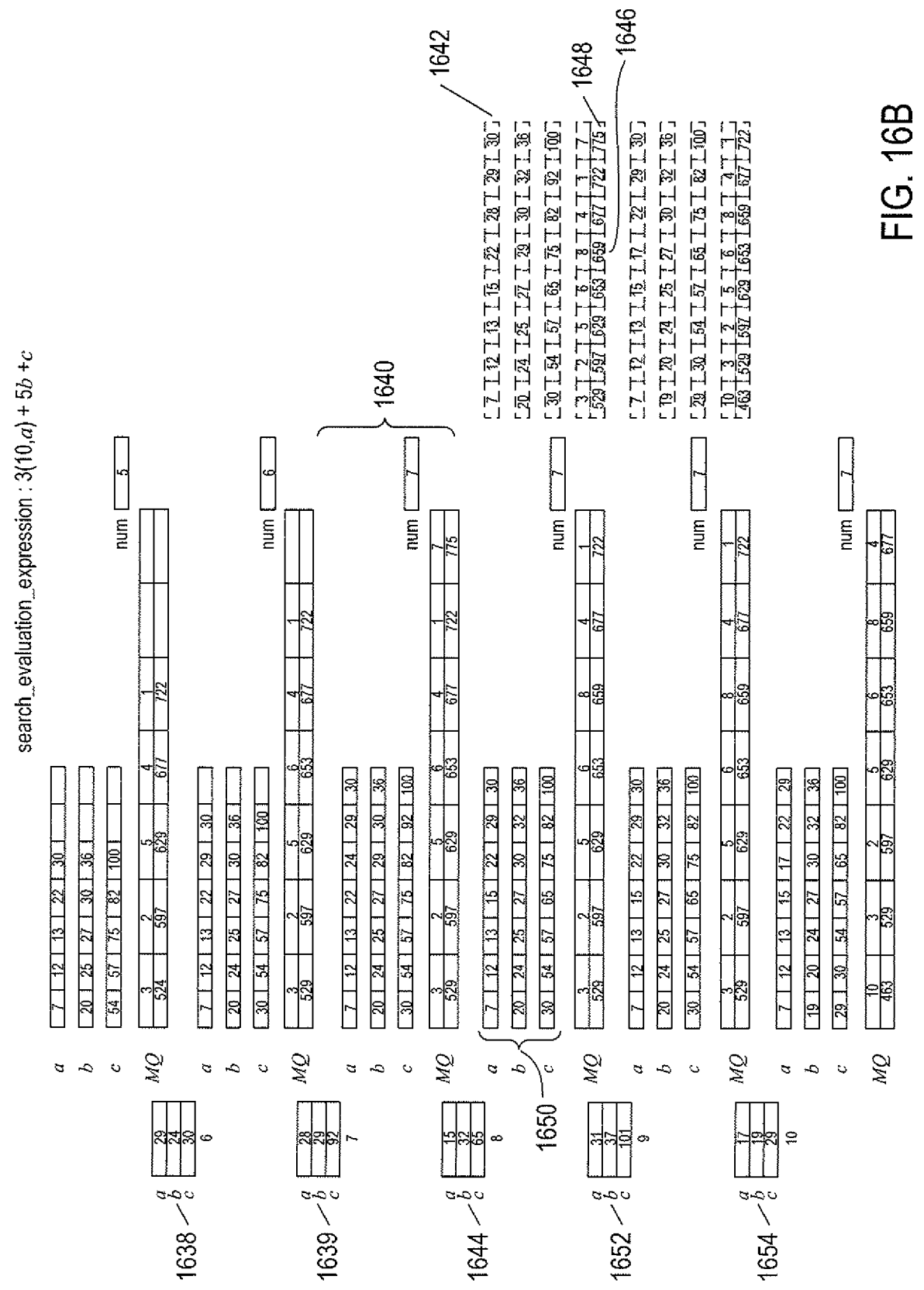

FIGS. 16A-B illustrate operation of the evaluator queues and master queue within an active search context. In this example, a dynamic-attribute-value-request message, a type of information-request message, is transmitted to target participants to obtain current values for each of 3 attributes a, b, and c. The search-evaluation expression 1602 associated with the distributed search is: 3(10,a)+5b+c. The "+" operators indicate that a score is computed by adding values computed for each evaluator. The first evaluator, 3(10,a), has a weight equal to 3, a floor equal to 10, and is computed from the current value of attribute a. The second evaluator 5b has a weight of 5 and is computed from the current value of attribute b. The third evaluator is simply the value of attribute c. The search-evaluation expression is used to compute scores for each received response message, with lower scores more favorable than higher scores. Three evaluator queues 1604-1606 store, in sorted order, the values for attributes a, b, and c for the participant responses stored in the master queue MQ 1608. The number of stored responses is indicated in the variable num 1609. In FIGS. 16A-B, the state of the evaluator queues and the master queue are indicated before and after reception of each of a series of responses to dynamic-attribute-value-request messages. Initially, the queues are empty 1610. After a first response 1612 is received, an entry is placed in each queue, resulting in the queue state 1614. The first response message 1612 includes numeric values for the three attributes a, b, and c 1615, 1616, and 1617. It is also associated with an identifier, or ID 1618. In this example, the IDs are simple monotonically increasing integers starting with "1."

Next, processing of the first response message 1612 is described. The three attribute values 1615-1617 are entered into their respective queues 1620-1622. Because the queues are initially empty, they become the first entries in the queues and are therefore in sorted order. Then, a score is computed using the search-evaluation expression 1602. First, if a returned value is less than the floor in the evaluator associated with the attribute value, an initial evaluator score is set to the floor value. Otherwise, the initial evaluator score is set to the value returned in the response message. Then, a percentage or ratio is computed for each initial evaluator score and the maximum value in the queue in which the associated attribute value was inserted. The ratio is multiplied by 100 to generate an intermediate evaluator score in the range [0, 100]. Then, the intermediate evaluator score is multiplied by the weight to produce a final evaluator score. The three evaluator scores are then added to produce the final score for the response message. In the case of the first response message 1612, all of the returned attribute values are the maximum values in the queues. Therefore, the score is computed as:

$$(3\times((30\div30)\times100))+(5\times((25\div25)\times100))+((75\div75)\times100)=900$$

This score is entered, in association with the identifier for the response message "1," into the master queue as the first entry 1624. There is now one entry in the master queue and each evaluator queue, so the variable num now has the value "1" 1625. Of course, this is merely one way to compute a score from the search-evaluation expression and returned attribute values. Many other types of score computations can be used. For example, the rank of an attribute value in an evaluator queue can be used in addition to, or in place of, the percentage of the maximum value in the queue to compute the intermediate evaluator score. The raw computed ratios of values to max values in queues can be used, rather than percentages. Exponentials and logarithms can be employed to generate non-linear scoring methods. Evaluator scores may be combined by operations other than addition. However, the currently described method has proven to provide good results for certain multi-attribute search results.

A second response message 1626 is then received, and the same operations are performed. Because the values in the evaluator queues are sorted in ascending order, and because the value "100" for attribute c in the second response message 1627 is greater than the value "75" for attribute c in the first response message 1617, the value "100" is now at the end of the evaluator queue 1628 for attribute c. The scores for the first and second messages are now recomputed as:

$$(3\times((30\div30)\times100))+(5\times((25\div25)\times100))+((75\div100)\times100)=875$$

$$(3\times((22\div30)\times100))+(5\times((20\div25)\times100))+((100\div100)\times100)=720$$

In the illustrated queue states, the master queue is kept sorted, in ascending order, so the score and identifier for the second response message occupies the first position 1629 in the master queue and the identifier and score for the second response message now occupies the second position 1630 in the master queue. Again, the lower the score, the more desirable the response. As will be seen, below, the active search context is designed to retain a set of the lowest-scored response messages, alternatively referred to as "most favorably scored response messages," received during the course of the distributed search.

A third response message 1632 is then received, and the same operations are performed. In this case, the value for attribute a, "7," 1634 is lower than the floor "10" for the first evaluator, so the value "10" is used instead of the value "7" in computing the evaluator score associated with attribute a. The scores for all three messages are recomputed as:

$$(3\times((30\div30)\times100))+(5\times((25\div27)\times100))+((75\div100)\times100)=837$$

$$(3\times((22\div30)\times100))+(5\times((20\div27)\times100))+((100\div100)\times100)=690$$

$$(3\times((10\div30)\times100))+(5\times((27\div27)\times100))+((54\div100)\times100)=654$$

In this example, the master queue is kept sorted, in ascending order, so the score and identifier for the second response message occupies the first position 1629 in the master queue and the identifier and score for the second response message now occupies the second position 1630 in the master queue.

Four more response messages 1636-1639 are received, resulting in the queue state 1640 shown in FIG. 16B. At this point, the evaluator queues and the master queue are full. From now on, any newly received response message added to the master queue along with individual attribute values added to the evaluator queues, will involve discarding an entry from each queue. This only occurs when the score computed for the newly received response message is lower than one of the scores in the master queue. As more and more responses are received, the likelihood that any next received response will be entered into the evaluator and master queues quickly decreases to a relatively low value for most types of distributed searches. The operations now become slightly more complex. First, as shown in a scratch-pad representation 1642 of the evaluator and master queues, there is an additional entry in each queue that can temporarily accommodate the attribute values and score for a newly received message. The scores are computed based on all of the entries, including those for the newly arrived response, and then the entries for the response with the highest score are deleted. Newly arrived response 1644 with ID equal to "8" ends up with a score "658," placing it towards the middle 1646 of the scratch-pad master queue. The score for response message "7" 1648 is now highest, and therefore the entries for that response message are deleted from the queues to produce queue state 1650.

The ninth response message 1652 arrives with each attribute value greater than the current maximum value in the respective evaluator queue. As a result, no new scores need be computed, since there is no possibility that a score computed for the ninth response message could be lower than any of the scores currently residing in the master queue. The ninth response is thus immediately rejected and the queue state 1654 remains unchanged.

FIGS. 17A-G provide a simple C++ implementation of the evaluator queues and master queue within an active search context. In fact, this implementation was used to generate the scores and queue entries shown in FIGS. 16A-B. Other details and logic associated with the active search context are not implemented, for sake of clarity and brevity.

First, a number of constant values 1702 are declared. These are constants used to indicate absence of values and to define the sizes of various arrays. In a production implementation, careful dynamic allocation of data structures would be used to avoid wasting unused memory for data structure. A structure declaration 1704 provides for an evaluator used in search-evaluation expressions, the structure Evaluator including a weight 1705 and a floor 1706 value. An array of Evaluator structures implements each search-evaluation expression, with the associated attribute identified by the index of each Evaluator structure in the array.

An instance of the class message 1708 represents a response message containing attribute values. Data members include an identifier ID 1709, the number of attribute values included in the message num 1710, and an array values 1711 that contains the attribute values. Note that, for this example, attribute values are assumed to be floating-point values. The class message includes a few member functions that retrieve and set the values of the data members.

An instance of the class attributeValueQueue 1714 represents an evaluator queue within an active search context. An instance of the class attributeValueQueue stores attribute values in ascending sorted order within the data-member array q 1715. The data member num 1716 contains an indication of the number of attribute values stored in the array q 1715. The class attributeValueQueue provides five member functions: (1) getMax( ) 1717, which returns the maximum-valued attribute value stored in the array q; (2) getNum( ) 1718, which returns the number of attribute values in the array q; (3) insert(double nxt) 1719, which inserts an attribute value nxt into the array q, preserving sorted ordering of attribute values within the array q; (4) prune(double val) 1720, which removes attribute value val from the array q; and (5) a constructor attributeValueQueue( ) 1721. The type definition QPTR 1722 defines a pointer-to-an-attribute-value-queue type.

An instance of the class masterQueue represents a master queue within an active search context. An instance of the class masterQueue includes the following data members: (1) q[MAX_QUEUE_SIZE] 1725, an array that holds response messages; (2) num 1726, the number of response messages currently in the array q; (3) scores[MAX_QUEUE_SIZE] 1727, an array that contains the scores computed for the response messages contained in the array q; (4) searchEval 1728, the search-evaluation expression for the distributed search associated with the active search context containing the instance of the class masterQueue; and (5) numAtt 1729, the number of attributes in response messages as well as the number of evaluators in the search-evaluation expression. The class masterQueue includes the following function members: (1) getNum( ) 1730, which returns the number of response messages and scores in arrays q and scores, respectively; (2) getBest( ) 1731, which returns highest scored response message in array q; (3) getNextBest( ) 732, which returns the next highest scored response message; (4) insert (message nxt, message& gone, double*maxArray) 1733, which attempts to insert a next response message nxt into the master queue, returning the displaced message into argument gone when the attempt succeeds and the master queue was full prior to the insertion of the new response message, with the maximum attribute values in the evaluator queues provided by argument maxArray; and (5) a constructor masterQueue (int numA, Evaluator*sEval) 1734.

An instance of the class searchContext represents an active search context. An instance of the class searchContext includes the following data members: (1) queues[MAX_QUEUES]1737, an array that contains a pointer to each evaluator queue in the active search context; (2) maxes [MAX_QUEUES] 1738, a data member that contains the number of response messages currently in the master queue and the number of attribute values in the evaluator queues; (3) MQ 1739, the master queue; (4) numAttributes 1740, the number of evaluator queues, attribute values in each response message, and evaluator terms in the search-evaluation expression; (5) searchEvaluator 1741, the search-evaluation expression for the distributed search represented by the active search context; and add 1742 and prev 1743, used by a pair of functions that retrieve search results from an instance of the class search Context. The class searchContext includes the following function members: (1) inputMessage (message m) 1744, which attempts to input a next received response message into the master queue; (2) getNumResults( ) 1745, which returns the number of results contained in the active search context; (3) getFirstResult( ) 746, which returns the highest scored response message; (4) getNextResult( ) 1747, which returns the next highest scored response message; and (5) a constructor 1748 and destructor 1749 searchContext(int numA, Evaluator*sE) and ~searchContext( ), respectively.

FIGS. 17B-G show implementations for most the member functions of the classes message, attributeValueQueue, masterQueue, and searchContext. Many are straightforward and could easily be alternatively implemented as inline functions. The implementations 1750 and 1752 for the attributeValueQueue member functions insert and prune, shown in FIG. 17D, insert an attribute value and remove an attribute value, respectively, while shifting any other stored values in order to maintain the ascending sorted order. When inserting a value, the proper location is found, and, if there is a stored value in that location, the stored value and subsequent stored values are shifted forward before inserting the value at the location. Similarly, when pruning a value, the location of the pruned value is filled in by shifting other values backward.

The implementation of the function member inputMessage 1754 of the class searchContext is shown in FIG. 17F. This member function carries out a first portion of response-message evaluation and insertion. In the if-statement and nested for-loop 1756, when the master queue is full and the attribute values in an input response message are all greater than the maximum values in their respective evaluator queues, no attempt is made to store the input message within the active search context, since the input message would necessarily have a higher score than any message currently stored in the active search context. Otherwise, the attribute values in the response message are inserted into the evaluator queues, in for-loop 1758, an attempt is made to insert the response message into the master queue 1760, and, when the attempt succeeds, the attribute values of the displaced message, if any, are removed in for-loop 1762.

The implementation of the function member insert 1754 of the class masterQueue is shown in FIG. 17E. This member function carries out a second portion of response-message insertion. In statement 1764, the response message is inserted into the master queue. There is one additional scratch-pad slot in the master queue, so that the insertion takes place even when the master queue is full. In for-loop 1766, all of the response messages are rescored, and the highest scored response message is identified by local variables maxIndex and maxScore. When the master queue was initially full, the entry with the highest score is removed, in if-statement 1768.

The C++ implementation of FIGS. 17A-G is intended only to show operation of the evaluator queues and the master queue as response messages are received and attempted to be input to the active search context. Many other operations, including search termination detection and completion, involve additional member data and member functions not shown in FIGS. 17A-G. Various optimizations are possible. For example, only those portions of response-message scores corresponding to evaluator queues for which the maximum value is changed by an attempted insertion of a response message need be recomputed. The scores could therefore be stored as a set of terms, and only those terms for which the maximum stored values have changed would need to be recomputed. As mentioned above, there are many different possible scoring techniques which can be alternatively implemented, including scoring based, at least in part, on the rank of attribute values within ordered evaluator queues. In the implementation of FIGS. 17A-G, each evaluator term of the search-evaluation expression is assumed to be associated with a single positive-minimum attribute, but, in alternative implementations, more complex terms may be allowed and evaluated.

Figure 18A:
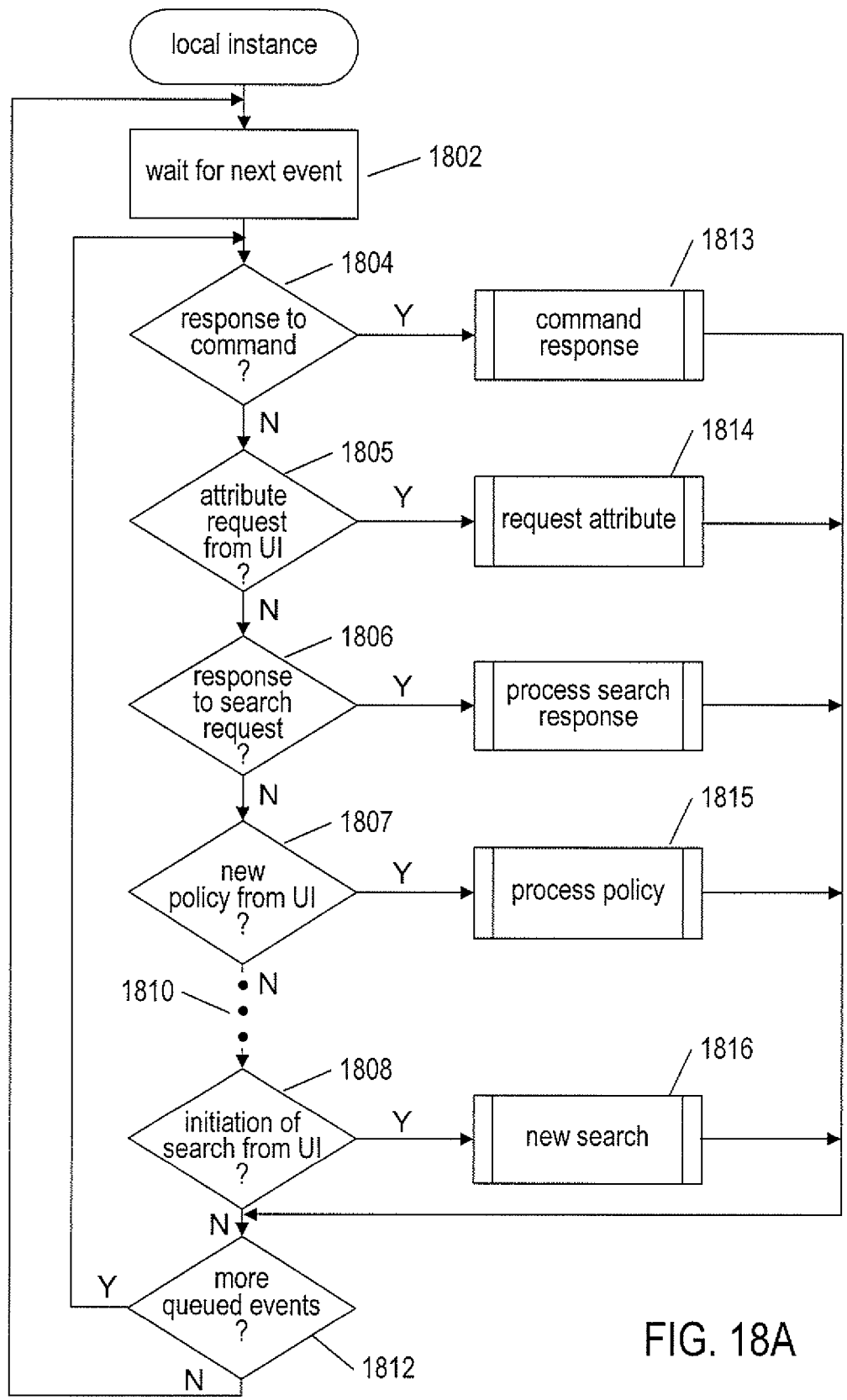
FIGS. 18A-F provide control-flow diagrams that illustrate portions of one implementation of the currently disclosed distributed-search methods and subsystems.

FIGS. 18A-F provide control-flow diagrams that illustrate portions of one implementation of the currently disclosed distributed-search methods and subsystems. FIG. 18A illustrates an event loop that underlies one implementation of a local instance of the distributed-search subsystem. The local instance of the distributed-search subsystem continuously waits for a next event to occur, in step 1802, and, when a next event occurs, selects an appropriate event handler and invokes the handler in a series of conditional steps 1804-1808. Ellipses 1810 indicate that many other types of events may be detected and handled by a given implementation. When additional events have been queued for handling, as determined in step 1812, control flows to step 1804. Otherwise, control flows to step 1802, where the event loop again waits for a next subsequent event to occur. Many of the event types correspond to messages received from a distributed-search user interface or from a centralized distributed-search engine. Examples include responses to command requests, handled by a command-response handler 1813, requests for attributes, handled by a request-attribute handler 1814, and received policies for storage and processing, handled by a process-policy handler 1815. The new-search handler 1816 is invoked to handle a request, from the distributed-search user interface, to initiate a new distributed search received by the local instance of the distributed-search subsystem.

Figure 18B:
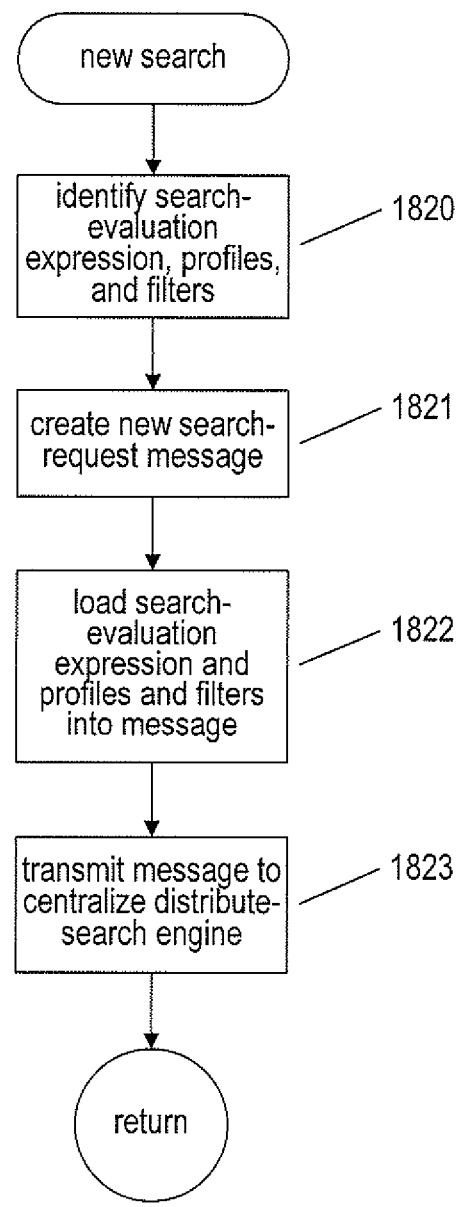

FIG. 18B illustrates the new-search handler called in step 1816 of FIG. 18A. In step 1820, the new-search handler identifies the search-evaluation expression, profiles, and filters specified in the search-initiation request. In step 1821, the new-search handler creates a new search-request message for transmission to a centralized distributed-search engine. In step 1822, the new-search handler loads the search-evaluation expression, profiles, and filters specified in the search-initiation request and, in step 1823, transmits the search-request message to the centralized distributed-search engine.

Figure 18C:
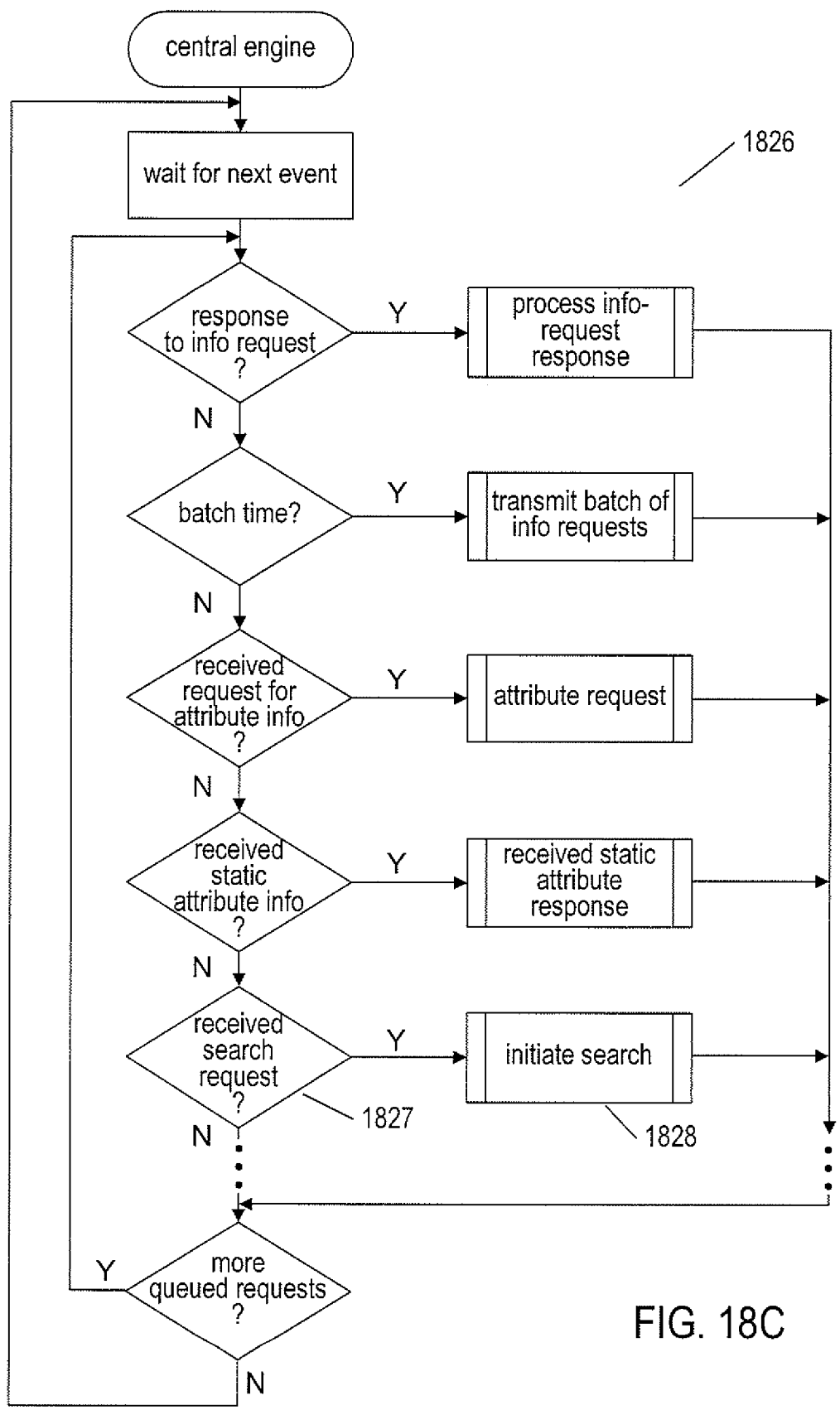

FIG. 18C illustrates an event loop 1826 that underlies one implementation of a centralized distributed-search engine. This event loop is similar to that shown in FIG. 18A. The centralized distributed-search engine waits for the occurrence of, and handles, various types of events, many associated with received messages from local instances of the distributed-search subsystem For example, when a search-request, sent by a local instance of the distributed-search subsystem in step 1823 of FIG. 18B, is received by the centralized distributed-search engine, an initiate-search handler 1828 is called, in step 1828 to initiate a new distributed search.

Figure 18D:
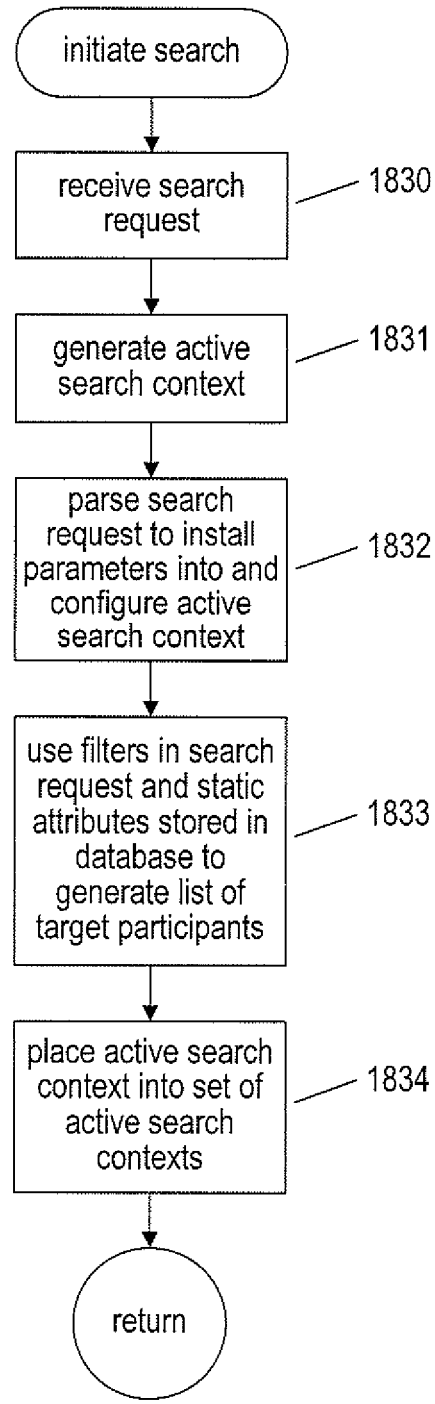

FIG. 18D illustrates the initiate-search handler invoked in step 1828 of FIG. 18C. In step 1830, the initiate-search handler receives the search-request message received by the centralized distributed-search engine. In step 1831, the initiate-search handler creates a new active-search context data structure for the new distributed search. In step 1832, the initiate-search handler parses the search-evaluation expression, profiles, and filters included in the search-request in order to obtain values for search parameters included in the active-search context to control execution of the distributed search. In step 1833, filters included in the search request are used, by the initiate-search handler, along with static attributes for distributed-search-subsystem participants to generate a list of target participants for the search. For example, were a filter included in the search-request message to include an attribute/value pair indicating that an entity needs to be associated with an attribute a having at least the numeric value 75, then participants associated with entities having only values for attribute a less than 75 would not be selected as target participants for the search. The target candidates identities and addresses, or expressions, functions, or other information from which target candidates identities and addresses can be derived, during execution of the distributed search, are included in the active search context. Finally, in step 1834, the initiate-search handler places the newly created active-search context data structure into the set of active search contexts (1330 in FIG. 13B), periodically accessed by a centralized-distributed-search-engine monitor to transmit information requests to target participants and detect distributed-search termination conditions.

Figure 18E:
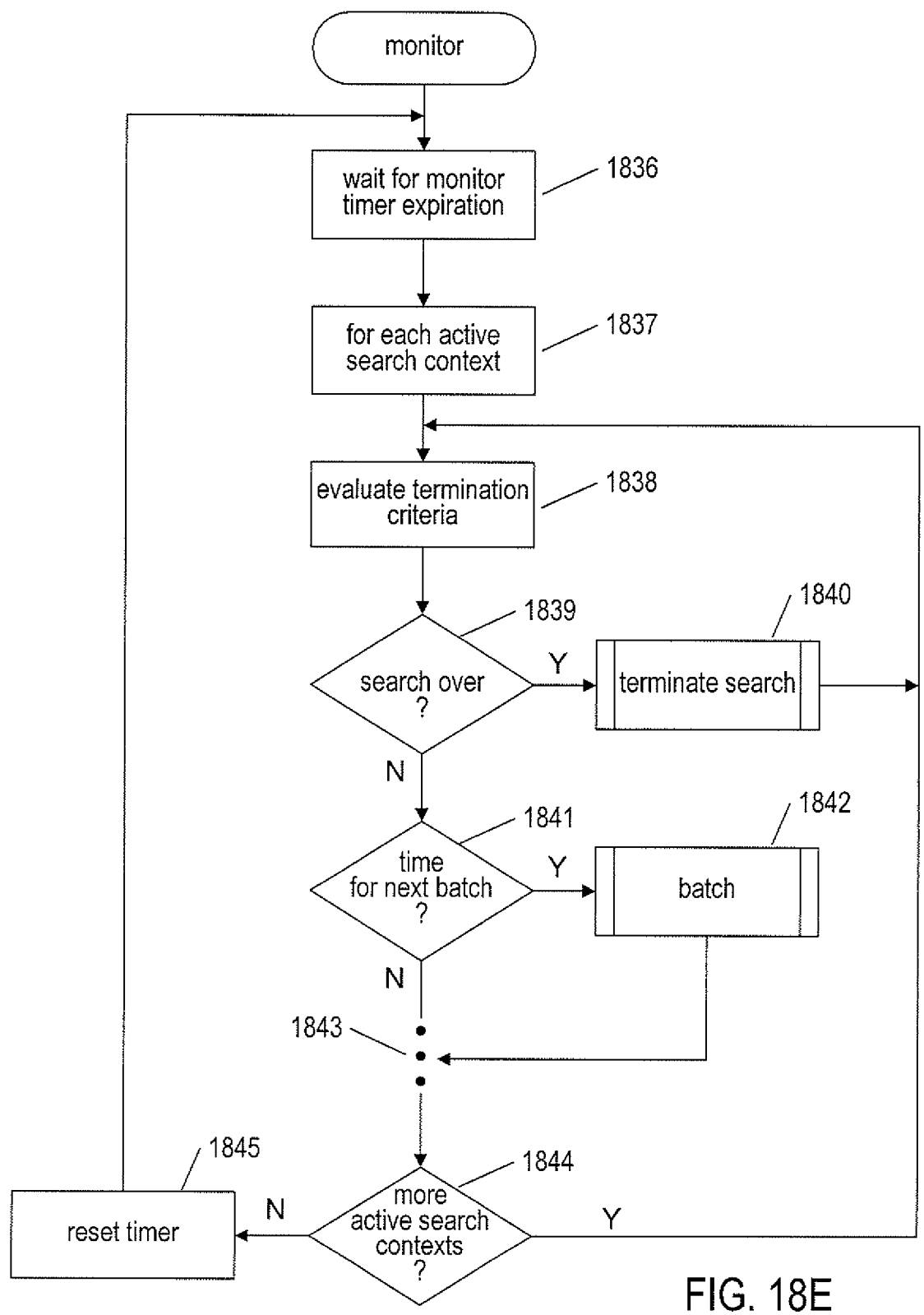

FIG. 18E illustrates the centralized-distributed-search-engine monitor that carries out operations during execution of distributed searches. In step 1836, the monitor waits for a next timer expiration or another event, such as empty-transmission-queue events, that signal the monitor to access the active search contexts and undertake any needed operations. In the for-loop of steps 1837-1844, each active search context is considered by the monitor. In step 1838, the monitor evaluates the termination criteria for the currently considered active search context. When the termination criteria are satisfied, as determined in step 1839, such as when the current date and time exceeds a termination date and time or when a maximum number of responses to information requests have been received from target participants, the monitor calls a terminate-search routine, in step 1840, to terminate the distributed search. When the current time exceeds or equals a time indicated in the active search context to transmit a next batch of information requests, as determined in step 1841, a batch routine is called, in step 1842, to transmit the next batch of information requests. Ellipses 1843 indicate that many other types of tasks or operations may be undertaken by the monitor based on information contained in the currently considered active search context as well as additional information, including system time, resource loading and resource availability within the distributed computer system, and information about many other factors and conditions. When there are more active search contexts to examine, as determined in step 1844, control flows back to step 1838. Otherwise, the timer is reset, in step 1845, and control flows back to step 1836, where the monitor waits for another timer-expiration event, queue-empty event, or another event.

Figure 18F:
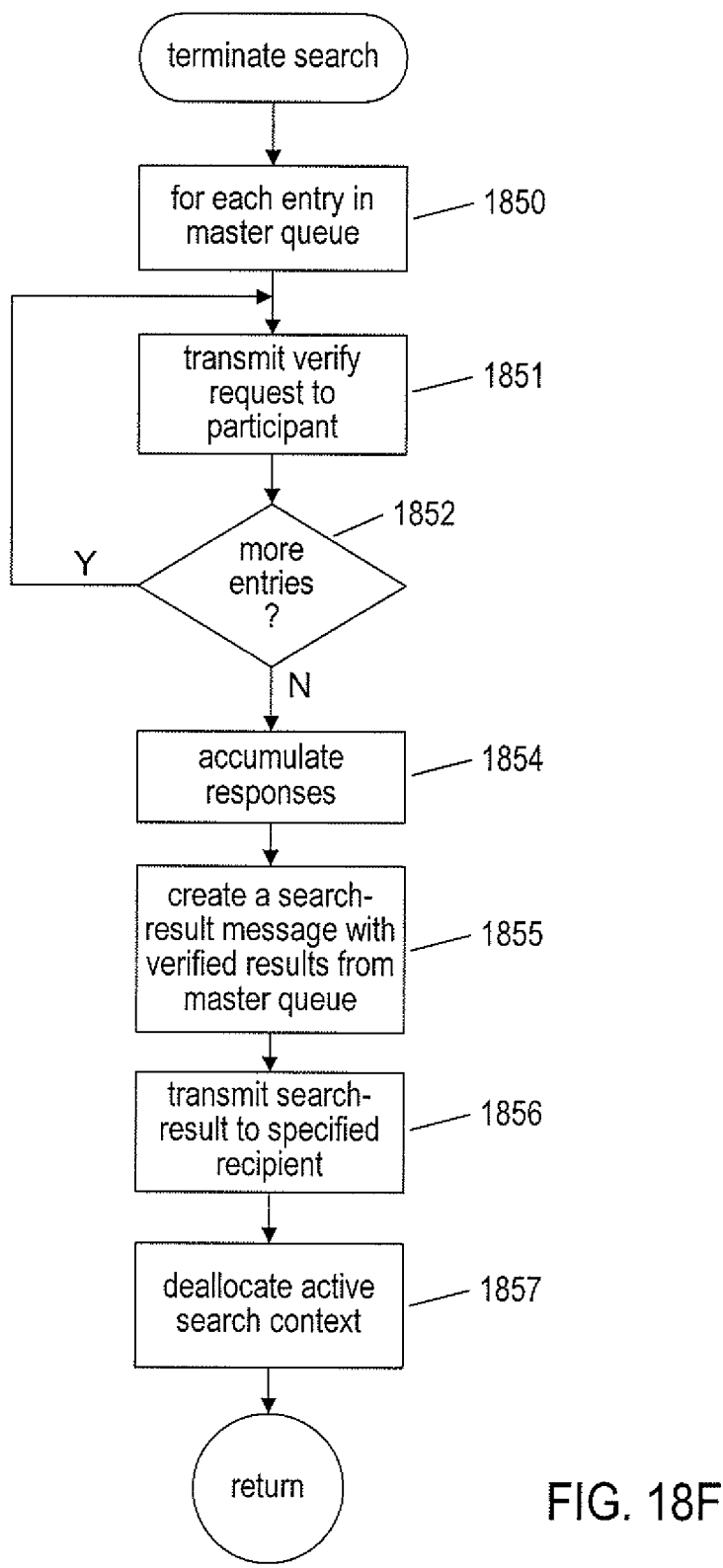

FIG. 18F illustrates the terminate-search routine called in step 1840 of FIG. 18E. In the for-loop of steps 1850-1852, a verification request is transmitted to the participant associated with each response message in the master queue to verify that the attribute values returned in the response message are still valid. A distributed search may execute over significant time periods, as a result of which time-sensitive attribute values may have changed since the response message was transmitted. In step 1854, the responses to the verification requests are accumulated. This may involve an operating-system-style wait, allowing processing resources to be used for other tasks and operations until the responses to the verify-request messages are received. In step 1855, a search-result message with verified attribute values from the response messages contained in the master queue is created. In step 1856, the search-result message is transmitted to the recipient initially specified in the search-request message. Finally, in step 1857, the active search context is deallocated.

Although the present invention has been described in terms of particular embodiments, it is not intended that the invention be limited to these embodiments. Modifications within the spirit of the invention will be apparent to those skilled in the art. For example, many different design and implementation parameters can be varied to produce alternative implementations, including choice of operating system, the hardware platforms and virtualization layers that are controlled by the distributed service-based application, modular organization, control structures, data structures, and other such parameters. Many different optimizations and alternatives to the above-described distributed-search architecture and result-collection methods and systems are possible. The lengths of the evaluator queues and master queue may be changed, for example. Various optimizations may be used to minimize score recomputation. Scores may be computed in many different ways. Many different types of parameters may be used to control distributed-search execution.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A distributed-search subsystem comprising:
 a distributed computer system that includes multiple servers, communications subsystems, and data-storage subsystems;
 one or more local instances of the distributed-search subsystem, each local instance of the distributed-search subsystem
  providing a distributed-search interface,
  storing and maintaining local data, including filters, profiles, and search-evaluation expressions, and
  communicating with a centralized distributed-search engine; and
 one or more centralized distributed-search engines, each centralized distributed-search engine
  communicating with one or more local instances of the distributed-search subsystem,
  communicating with distributed-search participants,
  storing and maintaining centralized-distributed-search-engine data, including values of static attributes continuously requested from, and returned by, distributed-search participant systems, and
  maintaining, for each distributed search, an active search context that includes parameter values that control execution of the distributed search,
   one or more evaluator queues that each maintains an ordered set of attribute values returned by queried distributed-search participant systems, and
   a master queue that maintains a set of entries, each entry of the set describing a response returned by a queried distributed-search participant system and containing a score.

2. The distributed-search subsystem of claim 1 wherein the one or more local instances of the distributed-search subsystem each comprise a web application executed by a virtual execution environment within a server.

3. The distributed-search subsystem of claim 1 wherein one or more centralized distributed-search engines each comprise control programs executing in one or more virtual execution environments within one or more servers.

4. The distributed-search subsystem of claim 1 wherein the distributed-search interface provided by each local instance of the distributed-search subsystem provides facilities to:
 create and store filters;
 create and store profiles;
 create and store search-evaluation expressions; and
 request initiation of distributed searches.

5. The distributed-search subsystem of claim 4 wherein, in response to receiving a request to initiate a distributed search through the distributed-search interface, a local instance of the distributed-search subsystem packages a search-evaluation expression into a search-request message that the local instance of the distributed-search subsystem then transmits to a centralized distributed-search engine.

6. The distributed-search subsystem of claim 5 wherein the local instance of the distributed-search subsystem additionally packages, along with the search-evaluation expression, one or more filters and one or more profiles into the search-request message.

7. The distributed-search subsystem of claim 1 wherein, when a centralized distributed-search engine receives a search-request message, the centralized distributed-search engine: creates an active search context to describe and maintain state for the requested distributed search with parameter values specified in, or derived from, policies included in the search-request message and/or with default parameter values maintained by the centralized distributed-search engine;
- uses filters included in the search-request message, along with the stored static-attribute values, to generate a set of target participants, and
- places the active search context into a set of active search contexts monitored by the centralized distributed-search engine during distributed-search execution.

8. The distributed-search subsystem of claim 7 wherein the centralized distributed-search engine transmits dynamic-attribute-value-request messages to the target participants to obtain dynamic attribute values, included in response messages returned by the target participants, that are candidates for inclusion in the master queue.

9. The distributed-search subsystem of claim 7 wherein, when the centralized distributed-search engine receives a response message containing dynamic attribute values, the centralized distributed-search engine:
- identifies the active search context for the distributed search in the context of which the response message is sent;
- adds each dynamic attribute value extracted from the response message to a corresponding evaluator queue;
- adds the response message, or portions of the response message, as an entry to the master queue;
- computes a score for each entry in the master queue and adds the score to the entry; and
- when the master queue is completely full, removes a least-favorably-scored entry from the master queue along with the dynamic attribute values associated with the entry from the evaluator queues.

10. The distributed-search subsystem of claim 1 wherein attributes are identified by alphanumeric names and wherein attributes have values.

11. The distributed-search subsystem of claim 10 wherein attributes include:
- entity attributes associated with entities for which distributed searches are executed;
- search attributes that specify parameter values that control execution of distributed searches; and
- searching participant attributes that characterize distributed-search-subsystem participants that request searches.

12. The distributed-search subsystem of claim 10 wherein entity attributes include:
- static attributes, the values for which are periodically requested and received from distributed-search-subsystem participants and centrally stored by centralized distributed-search engines; and
- dynamic attributes, the values for which are requested from target participants during execution of distributed searches.

13. The distributed-search subsystem of claim 10 wherein attribute values are selected from one of:
- elements of sets;
- elements of ordered sets;
- subsets of sets;
- subsets of ordered sets;
- numeric values;
- numeric-value ranges; and
- Boolean values.

14. The distributed-search subsystem of claim 1 wherein a search-evaluation expression comprises one or more evaluator terms.

15. The distributed-search subsystem of claim 14 wherein an evaluator term includes a positive-minimum attribute.

16. The distributed-search subsystem of claim 15 wherein an evaluator term additionally includes one or both of:
- a weight; and
- a floor.

17. The distributed-search subsystem of claim 1 wherein a score included in an entry of the master queue is generated, from the dynamic attribute values included in a response message from a queried distributed-search participant system and from a search-evaluation expression associated with, or referenced by, the active search context that includes the master queue, by:
- determining, for each evaluator in the search context
  - an initial value,
  - a ratio of the initial value divided by the maximum dynamic attribute value stored in the evaluator queue corresponding to the evaluator,
  - an intermediate value comprising a percentage corresponding to the ratio,
  - when the evaluator includes a weight different from 1, multiplying the intermediate value by the weight to generate a final value, and
  - when the evaluator does not include a weight different from 1, using the intermediate value as the final value, and
- combining the final values.

18. The distributed-search subsystem of claim 17 wherein the initial value is one of:
- the dynamic attribute value corresponding to the evaluator in the response message; and
- a floor included in the evaluator.

19. The distributed-search subsystem of claim 18 wherein combining the final values further comprises adding the final values together.

20. The distributed-search subsystem of claim 1 wherein a first score with a generated value less than the generated value of a second score is more favorable than the second score.

21. A method carried out in a distributed computer system that includes multiple servers, communications subsystems, and data-storage subsystems, the method comprising:
- providing, by one or more local instances of a distributed-search subsystem, a distributed-search interface;
- storing and maintaining, by the one or more local instances of a distributed-search subsystem, local data, including filters, profiles, and search-evaluation expressions; and
- communicating, by one or more local instances of a distributed-search subsystem, with a centralized distributed-search engine;
- communicating, by the centralized distributed-search engine, with one or more local instances of the distributed-search subsystem,
- communicating, by the centralized distributed-search engine, with one or more distributed-search participant systems, storing and maintaining, by the centralized distributed-search engine, centralized-distributed-search-engine data, including values of static attributes continuously requested from, and returned by, the one or more distributed-search participant systems, and maintaining, by the centralized distributed-search engine, for each distributed search an active search context that includes parameter values that control execution of the distributed search, one or more evaluator queues that each maintains an ordered set of attribute values returned by queried distributed-search participant systems, and a master queue that maintains a set of entries, each entry of the set describing a response returned by a queried distributed-search participant system and containing a score.

22. Computer instructions, encoded in a physical data-storage device, that, when read from the physical data-storage device and executed by one or more processors, control the one or more processors to carry out, in a distributed computer system that includes multiple servers, communications subsystems, and data-storage subsystems, a method comprising:

providing, by one or more local instances of a distributed-search subsystem, a distributed-search interface;

storing and maintaining, by the one or more local instances of a distributed-search subsystem, local data, including filters, profiles, and search-evaluation expressions; and communicating, by one or more local instances of a distributed-search subsystem, with a centralized distributed-search engine;

communicating, by the centralized distributed-search engine, with one or more local instances of the distributed-search subsystem, communicating, by the centralized distributed-search engine, with one or more distributed-search participant systems, storing and maintaining, by the centralized distributed-search engine, centralized-distributed-search-engine data, including values of static attributes continuously requested from, and returned by, the one or more distributed-search participant systems, and maintaining, by the centralized distributed-search engine, for each distributed search an active search context that includes parameter values that control execution of the distributed search, one or more evaluator queues that each maintains an ordered set of attribute values returned by queried distributed-search participant systems, and a master queue that maintains a set of entries, each entry of the set describing a response returned by a queried distributed-search participant system and containing a score.

* * * * *